US012750859B2

(12) United States Patent
Lin et al.

(10) Patent No.: US 12,750,859 B2
(45) Date of Patent: Sep. 29, 2026

(54) TERMINAL DEVICES AND BASE STATION DEVICES

(71) Applicant: Sharp Kabushiki Kaisha, Sakai City (JP)

(72) Inventors: Huifa Lin, Sakai City (JP); Shoichi Suzuki, Sakai City (JP); Daiichiro Nakashima, Sakai City (JP); Toshizo Nogami, Sakai City (JP); Wataru Ouchi, Sakai City (JP); Tomoki Yoshimura, Sakai City (JP); Takahisa Fukui, Sakai City (JP); Ryota Morimoto, Sakai City (JP)

(73) Assignee: SHAP KABUSHIKI KAISHA, Sakai City (JP)

( * ) Notice: Subject to any disclaimer, the term of this patent is extended or adjusted under 35 U.S.C. 154(b) by 284 days.

(21) Appl. No.: 18/687,407

(22) PCT Filed: Sep. 20, 2022

(86) PCT No.: PCT/JP2022/036615
§ 371 (c)(1),
(2) Date: Feb. 28, 2024

(87) PCT Pub. No.: WO2023/048301
PCT Pub. Date: Mar. 30, 2023

(65) Prior Publication Data
US 2024/0365331 A1 Oct. 31, 2024

(30) Foreign Application Priority Data
Sep. 21, 2021 (JP) ................................ 2021-152785

(51) Int. Cl.
*H04W 72/231* (2023.01)
*H04B 7/06* (2006.01)
*H04W 72/1268* (2023.01)
*H04W 74/0833* (2024.01)

(52) U.S. Cl.
CPC ...... *H04W 72/231* (2023.01); *H04B 7/06968* (2023.05); *H04W 72/1268* (2013.01); *H04W 74/0833* (2013.01)

(58) Field of Classification Search
CPC .......... H04W 72/231; H04W 72/1268; H04W 74/0833; H04B 7/06968
See application file for complete search history.

(56) References Cited

U.S. PATENT DOCUMENTS

2020/0322807 A1* 10/2020 Si .......................... H04W 88/06

OTHER PUBLICATIONS

Official Communication issued in International Patent Application No. PCT/JP2022/036615, mailed on Nov. 29, 2022.

(Continued)

*Primary Examiner* — Samina F Choudhry
(74) *Attorney, Agent, or Firm* — Keating & Bennett, LLP

(57) ABSTRACT

Terminal device receives a SS/PBCH block, a MIB, and a PDCCH. The MIB includes a first MIB payload bit and a second MIB payload bit. The first MIB payload bit is used for indication of a candidate SS/PBCH block index corresponding to the SS/PBCH block A Q' value is indicated only by the second MIB payload bit. The Q' value is used for quasi co-location assumption among SS/PBCH blocks.

4 Claims, 18 Drawing Sheets

(56) References Cited

OTHER PUBLICATIONS

Intel Corporation, "Discussion on initial access aspects for extending NR up to 71 GHz", 3GPP TSG RAN WG1 #105-e, R1-2104894, May 19-27, 2021, pp. 1-18.
NEC, "Discussion on initial access aspects supporting NR from 52.6 to 71 GHz", 3GPP TSG RAN WG1 #106-e, R1-2107149, Aug. 16-27, 2021, 5 pages.

* cited by examiner

Figure 2A: Number of OFDM symbols per slot, slots per frame, and slots per subframe for normal cyclic prefix

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure 2B: Number of OFDM symbols per slot, slots per frame, and slots per subframe for extended cyclic prefix

| u | $N^{slot}_{symb}$ | $N^{frame,u}_{slot}$ | $N^{subframe,u}_{slot}$ |
|---|---|---|---|
| 2 | 12 | 40 | 4 |

Figure 2

Table 17-1: Mapping between the combination of *subCarrierSpacingCommon* and LSB of *ssb-SubcarrierOffset* to Q

| ***subCarrierSpacingCommon*** | **LSB of *ssb-SubcarrierOffset*** | $N_{SSB}^{QCL}$ |
|---|---|---|
| scs15or60 | 0 | 1 |
| scs15or60 | 1 | 2 |
| scs30or120 | 0 | 4 |
| scs30or120 | 1 | 8 |

Table 17-2: Mapping between the combination of *subCarrierSpacingCommon* and LSB of *ssb-SubcarrierOffset* to Q

| ***subCarrierSpacingCommon*** | **LSB of *ssb-SubcarrierOffset*** | $N_{SSB}^{QCL}$ |
|---|---|---|
| scs15or60 | 0 | q1 |
| scs15or60 | 1 | q2 |
| scs30or120 | 0 | q3 |
| scs30or120 | 1 | q4 |

Figure 17

Table 18-1: Mapping *subCarrierSpacingCommon* as the second MIB payload bit to Q'

| ***subCarrierSpacingCommon*** | **Q'** |
|---|---|
| scs15or60 | q1 |
| scs30or120 | q2 |

Table 18-2: Mapping LSB of *ssb-SubcarrierOffset* as the second MIB payload bit to Q'

| **LSB of *ssb-SubcarrierOffset*** | **Q'** |
|---|---|
| 0 | q1 |
| 1 | q2 |

Figure 18

TERMINAL DEVICES AND BASE STATION DEVICES

TECHNICAL FIELD

The present invention relates to terminal devices and base station devices.

BACKGROUND ART

In the 3rd Generation Partnership Project (3GPP), a radio access method and a radio network for cellular mobile communications (hereinafter, referred to as Long Term Evolution, or Evolved Universal Terrestrial Radio Access) have been studied. In LTE (Long Term Evolution), a base station device is also referred to as an evolved NodeB (eNodeB), and a terminal device is also referred to as a User Equipment (UE). LTE is a cellular communication system in which multiple areas are deployed in a cellular structure, with each of the multiple areas being covered by a base station device. A single base station device may manage multiple cells. Evolved Universal Terrestrial Radio Access is also referred as E-UTRA.

In the 3GPP, the next generation standard (New Radio: NR) has been studied in order to make a proposal to the International-Mobile-Telecommunication-2020 (IMT-2020) which is a standard for the next generation mobile communication system defined by the International Telecommunications Union (ITU). NR has been expected to satisfy a requirement considering three scenarios of enhanced Mobile BroadBand (eMBB), massive Machine Type Communication (mMTC), and Ultra Reliable and Low Latency Communication (URLLC), in a single technology framework.

For example, wireless communication devices may communicate with one or more devices using a communication structure. However, the communication structure may only offer limited flexibility and/or efficiency. As illustrated by this discussion, systems and methods that improve communication flexibility and/or efficiency may be beneficial.

BRIEF DESCRIPTION OF THE DRAWINGS

FIG. 2 is an example showing the relationship between subcarrier-spacing configuration u, a number of OFDM symbols per slot $N^{slot}_{symb}$, and the CP configuration according to an aspect of the present embodiment;

FIG. 17 is a diagram illustrating an example of mapping the combination of MIB payload bits to Q according to an aspect of the present embodiment.

FIG. 18 is a diagram illustrating an example of mapping a MIB payload bit to Q' according to an aspect of the present embodiment.

DESCRIPTION OF EMBODIMENTS floor (CX) may be a floor function for real number CX. For example, floor (CX) may be a function that provides the largest integer within a range that does not exceed the real number CX. ceil (DX) may be a ceiling function to a real number DX. For example, ceil (DX) may be a function that provides the smallest integer within the range not less than the real number DX. mod (EX, FX) may be a function that provides the remainder obtained by dividing EX by FX. mod (EX, FX) may be a function that provides a value which corresponds to the remainder of dividing EX by FX. exp (GX) may be an exponential function that may be expressed as e^GX, where e is the Napier number. (HX)^(IX) indicates IX to the power of HX. $\log_B$(JX) indicates logarithm of JX to base B. max (KX, LX) indicates the maximum value between KX and LX.

In a wireless communication system according to one aspect of the present embodiment, at least OFDM (Orthogonal Frequency Division Multiplex) is used. An OFDM symbol is a time domain unit in the OFDM. The OFDM symbol includes at least one or more subcarriers. An OFDM symbol is converted to a time-continuous signal in baseband signal generation. In downlink, at least CP-OFDM (Cyclic Prefix-Orthogonal Frequency Division Multiplex) is used. In uplink, either the CP-OFDM or the DFT-s-OFDM (Discrete Fourier Transform-spread-Orthogonal Frequency Division Multiplex) is used. The DFT-s-OFDM may be implemented by applying transform precoding to the CP-OFDM. The CP-OFDM is the OFDM using CP (Cyclic Prefix).

An OFDM symbol may be a designation including a CP added to the OFDM symbol. That is, an OFDM symbol may be configured to include the OFDM symbol and a CP added to the OFDM symbol.

Figure 1:
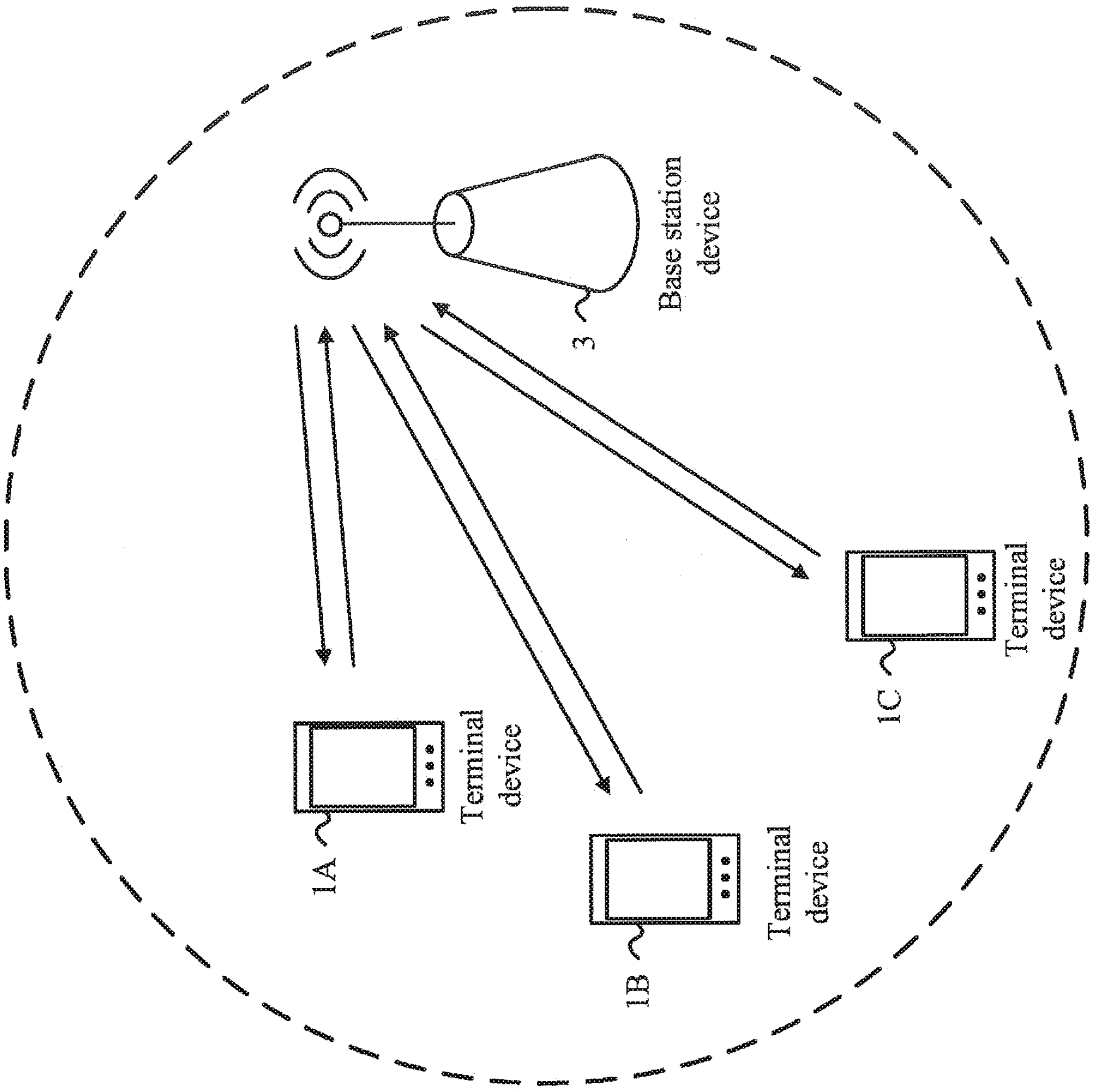
FIG. 1 is a conceptual diagram of a wireless communication system according to an aspect of the present embodiment.

FIG. 1 is a conceptual diagram of a wireless communication system according to an aspect of the present embodiment. In FIG. 1, the wireless communication system includes at least terminal device 1A to 1C and a base station device 3 (BS #3: Base station #3). Hereinafter, the terminal devices 1A to 1C are also referred to as a terminal device 1 (UE #1: User Equipment #1).

The base station device 3 may be configured to include one or more transmission devices (or transmission points, transmission devices, reception devices, transmission points, reception points). When the base station device 3 is configured by a plurality of transmission devices, the plurality of transmission devices may be arranged at different locations or at the same location.

The base station device 3 may provide/have/consist of one or more serving cells. A serving cell may be defined as a set of resources used for wireless communication. A serving cell is also referred to as a cell.

A serving cell may be configured to include at least one downlink component carrier (downlink carrier) and/or one uplink component carrier (uplink carrier). A serving cell may be configured to include at least two or more downlink component carriers and/or two or more uplink component carriers. A downlink component carrier and an uplink component carrier are also referred to as component carriers (carriers).

For example, one resource grid may be provided for one component carrier. For example, one resource grid may be provided for one component carrier and a subcarrier-spacing configuration u. The subcarrier-spacing configuration u is also referred to as numerology. A resource grid includes $N^{size,u}_{grid,x}N^{RB}_{sc}$ subcarriers. The resource grid starts from a common resource block with index $N^{start,u}_{grid}$. The common resource block with the index $N^{start,u}_{grid}$ is also referred to as a reference point of the resource grid. The resource grid includes $N^{subframe,u}_{symb}$ OFDM symbols. The subscript x indicates the transmission direction that may be either downlink or uplink. One resource grid is provided for an antenna port p, a subcarrier-spacing configuration u, and a transmission direction x.

$N^{size,u}_{grid,x}$ and $N^{start,u}_{grid}$ end are given based at least on a higher-layer parameter (e.g. referred to as higher-layer parameter CarrierBandwidth). The higher-layer parameter is used to define one or more SCS (SubCarrier-Spacing) specific carriers. One resource grid corresponds to one SCS specific carrier. One component carrier may comprise one or more SCS specific carriers. The SCS specific carrier may be included in a system information block (SIB). For each SCS specific carrier, a subcarrier-spacing configuration u may be provided.

FIG. 2 is an example showing the relationship between subcarrier-spacing configuration u, a number of OFDM symbols per slot $N^{slot}_{symb}$, and the CP configuration according to an aspect of the present embodiment. In FIG. 2A, for example, when the subcarrier-spacing configuration u is set to 2 and the CP configuration is set to normal CP (normal cyclic prefix), $N^{slot}_{symb}=14$, $N^{frame,u}_{slot}=40$, and $N^{subframe,u}_{slot}=4$. In FIG. 2B, for example, when the subcarrier-spacing configuration u is set to 2 and the CP configuration is set to an extended CP (extended cyclic prefix), $N^{slot}_{symb}=12$, $N^{frame,u}_{slot}=40$, $N^{subframe,u}_{slot}=4$.

In the wireless communication system according to an aspect of the present embodiment, a time unit $T_c$ may be used to represent the length of the time domain. The time unit $T_c$ is given by $T_c=1/(df_{max}*N_f)$, where $df_{max}=480$ kHz and $N_f=4096$. The constant k is given by $k=df_{max}*N_f/(df_{ref}N_{f,ref})=64$, where $df_{ref}=15$ kHz and $N_{f,ref}=2048$.

Transmission of signals in the downlink and/or transmission of signals in the uplink may be organized into radio frames (system frames, frames) of length $T_f$, where $T_f=(df_{max}\,N_f/100)*T_s=10$ ms. One radio frame is configured to include ten subframes. The subframe length is $T_{sf}=(df_{max}N_f/1000)\,T_s=1$ ms. A number of OFDM symbols per subframe is $N^{subframe,u}_{symb}=N^{slot}_{symb}N^{subframe,u}_{slot}$.

For a subcarrier-spacing configuration u, a number of slots included in a subframe and indexes may be given. For example, slot index nus may be given in ascending order with an integer value ranging from 0 to $N^{subframe,u}_{slot}-1$ in a subframe. For subcarrier-spacing configuration u, a number of slots included in a radio frame and indexes of slots included in the radio frame may be given. Also, the slot index $n^u_{s,f}$ may be given in ascending order with an integer value ranging from 0 to $N^{frame,u}_{slot}-1$ in the radio frame. Consecutive $N^{slot}_{symb}$ OFDM symbols may be included in one slot. It is $N^{slot}_{symb}=14$.

Figure 3:
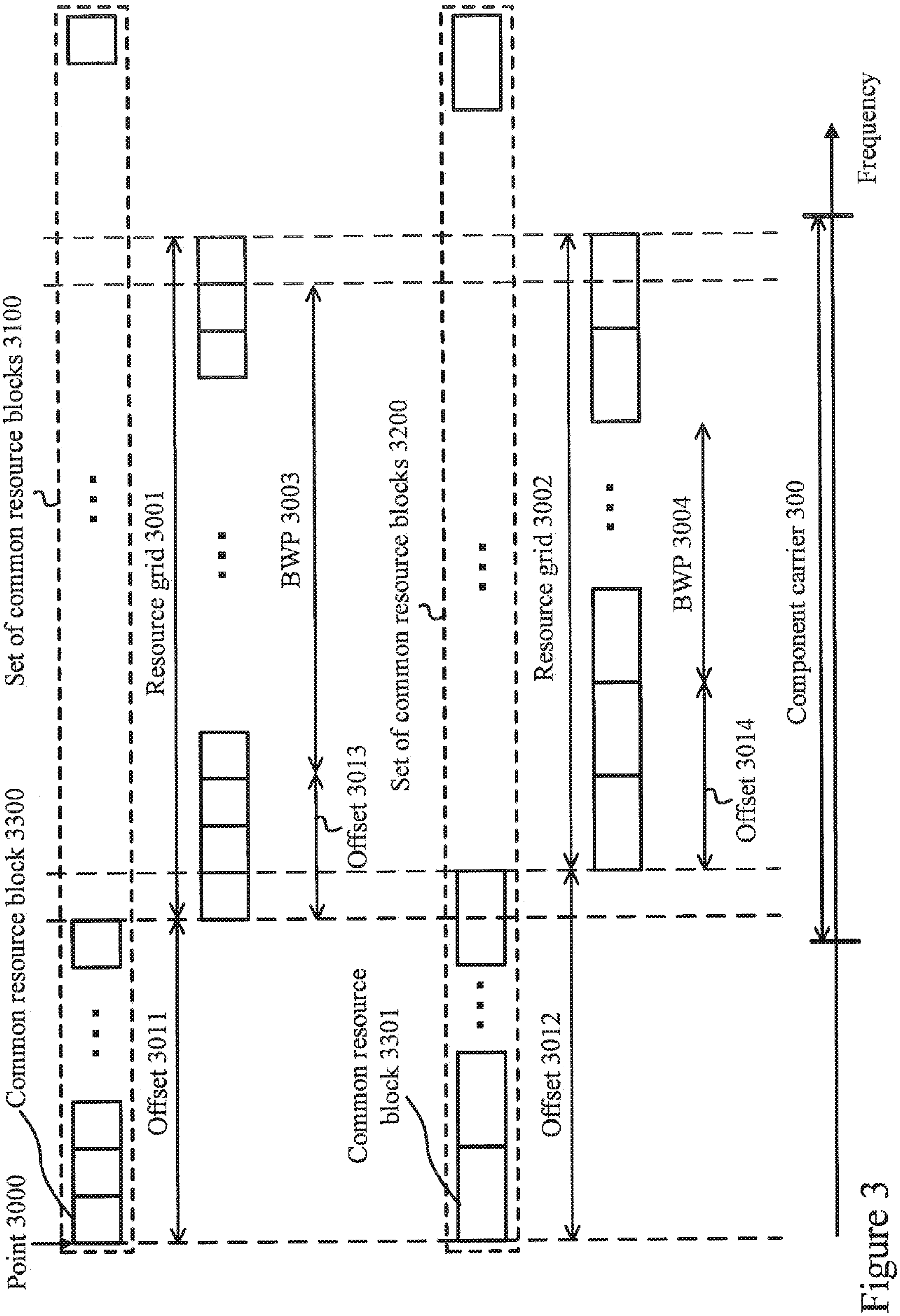
FIG. 3 is a diagram showing an example of a method of configuring a resource grid according to an aspect of the present embodiment.

FIG. 3 is a diagram showing an example of a method of configuring a resource grid according to an aspect of the present embodiment. The horizontal axis in FIG. 3 indicates frequency domain. FIG. 3 shows a configuration example of a resource grid of subcarrier-spacing configuration $u=u_1$ in the component carrier 300 and a configuration example of a resource grid of subcarrier-spacing configuration $u=u_2$ in a component carrier. One or more subcarrier-spacing configuration may be set for a component carrier. Although it is assumed in FIG. 3 that $u_1=u_2-1$, various aspects of this embodiment are not limited to the condition of $u_1=u_2-1$.

The component carrier 300 is a band having a predetermined width in the frequency domain.

Point 3000 is an identifier for identifying a subcarrier. Point 3000 is also referred to as point A. The common resource block (CRB: Common resource block) set 3100 is a set of common resource blocks for the subcarrier-spacing configuration $u_1$.

Among the common resource block-set 3100, common resource block 3300 including the point 3000 is also referred to as a reference point of the common resource block-set 3100. The reference point of the common resource block-set 3100 may be a common resource block with index 0 in the common resource block-set 3100.

The offset 3011 is an offset from the reference point of the common resource block-set 3100 to the reference point of the resource grid 3001. The offset 3011 is indicated by a number of common resource blocks which is relative to the subcarrier-spacing configuration $u_1$. The resource grid 3001 includes $N^{size,u}_{grid1,x}$ common resource blocks starting from the reference point of the resource grid 3001.

The offset 3013 is an offset from the reference point of the resource grid 3001 to the reference point ($N^{start,u}_{BWP,i1}$) of the BWP (BandWidth Part) 3003 of the index i1.

Common resource block-set 3200 is a set of common resource blocks with respect to subcarrier-spacing configuration $u_2$.

Common resource block 3301 in the common resource block-set 3200 is also referred to as a reference point of the common resource block-set 3200. The reference point of the common resource block-set 3200 may be a common resource block with index 0 in the common resource block-set 3200.

The offset 3012 is an offset from the reference point of the common resource block-set 3200 to the reference point of the resource grid 3002. The offset 3012 is indicated by a number of common resource blocks for subcarrier-spacing configuration $u=u_2$. The resource grid 3002 includes $N^{size,u}_{grid2,x}$ common resource blocks starting from the reference point of the resource grid 3002.

The offset 3014 is an offset from the reference point of the resource grid 3002 to the reference point ($N^{start,u}_{BWP,i2}$) of the BWP 3004 with index $i_2$.

Figure 4:
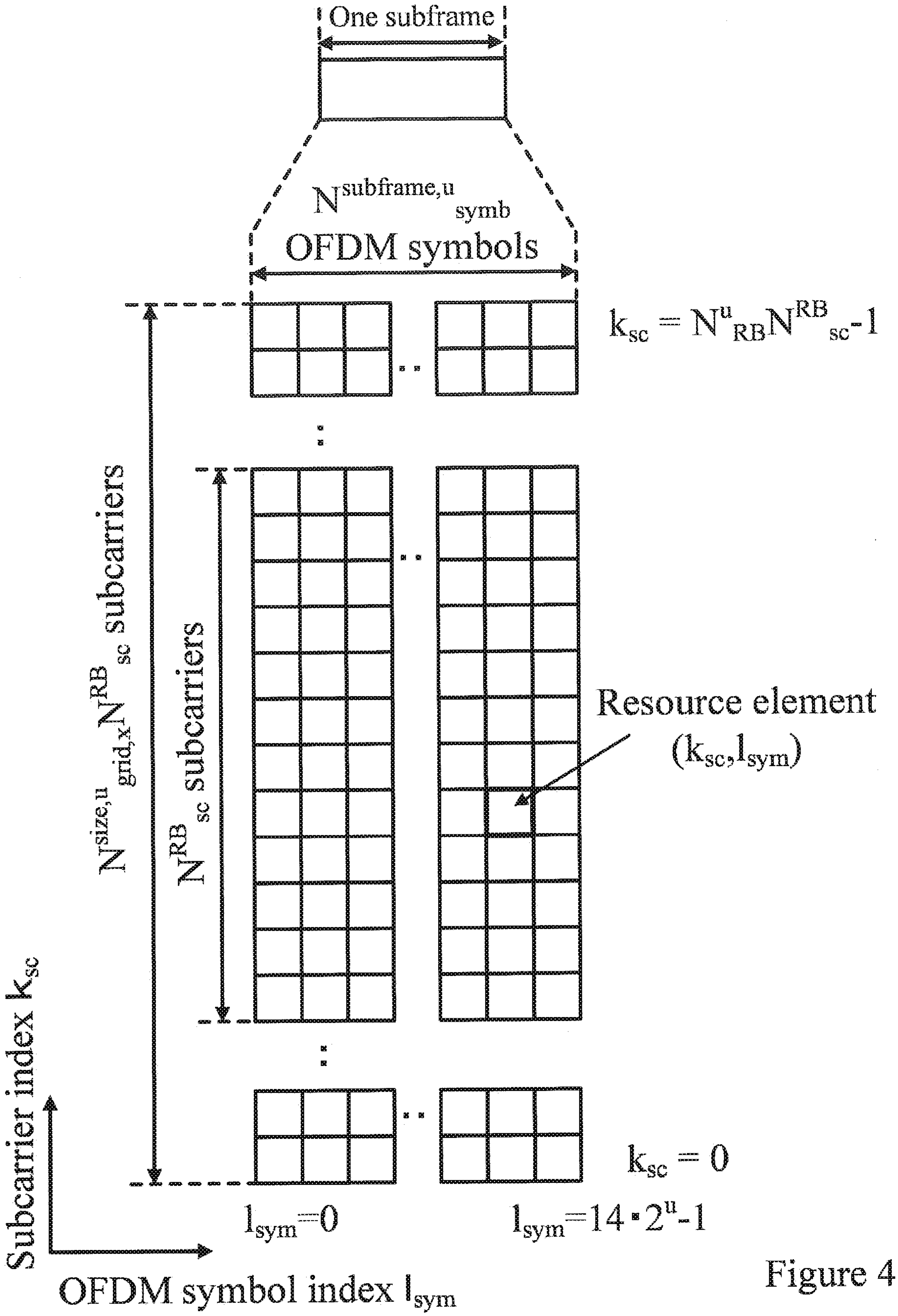
FIG. 4 is a diagram showing a configuration example of a resource grid 3001 according to an aspect of the present embodiment.

FIG. 4 is a diagram showing a configuration example of a resource grid 3001 according to an aspect of the present embodiment. In the resource grid of FIG. 4, the horizontal axis indicates OFDM symbol index $l_{sym}$, and the vertical axis indicates the subcarrier index $k_{sc}$. The resource grid 3001 includes $N^{size,u}_{grid1,x}N^{RB}_{sc}$ subcarriers, and includes $N^{subframes,u}_{symb}$ OFDM symbols. A resource specified by the subcarrier index $k_{sc}$ and the OFDM symbol index $l_{sym}$ in a resource grid is also referred to as a resource element (RE: Resource Element).

A resource block (RB: Resource Block) includes $N^{RB}_{sc}$ consecutive subcarriers. A resource block is a generic name of a common resource block, a physical resource block (PRB: Physical Resource Block), and a virtual resource block (VRB: Virtual Resource Block). $N^{RB}_{sc}$ may be 12.

A resource block unit is a set of resources that corresponds to one OFDM symbol in one resource block. That is, one resource block unit includes 12 resource elements which corresponds to one OFDM symbol in one resource block.

Common resource blocks for a subcarrier-spacing configuration u are indexed in ascending order from 0 in the frequency domain in a common resource block-set. The common resource block with index 0 for the subcarrier-spacing configuration u includes (or collides with, matches) the point 3000. The index $n^u_{CRB}$ of the common resource block with respect to the subcarrier-spacing configuration u satisfies the relationship of $n^u_{CRB}=\text{ceil}(k_{sc}/N^{RB}_{sc})$. The subcarrier with $k_{sc}=0$ is a subcarrier with the same center frequency as the center frequency of the subcarrier which corresponds to the point 3000.

Physical resource blocks for a subcarrier-spacing configuration u are indexed in ascending order from 0 in the frequency domain in a BWP. The index $n^u_{PRB}$ of the physical resource block with respect to the subcarrier-spacing configuration u satisfies the relationship of $n^u_{CRB}=n^u_{PRB}+N^{start,u}_{BWP,i}$. The $N^{start,u}_{BWP,i}$ indicates the reference point of BWP with index i.

A BWP is defined as a subset of common resource blocks included in the resource grid. The BWP includes $N^{size,u}_{BWP,i}$ common resource blocks starting from the reference points $N^{start,u}_{BWP,i}$. A BWP for the downlink component carrier is also referred to as a downlink BWP. A BWP for the uplink component carrier is also referred to as an uplink BWP.

An antenna port is defined such that the channel over which a symbol on the antenna port is conveyed can be inferred from the channel over which another symbol on the same antenna port is conveyed. For example, the channel may correspond to a physical channel. For example, the symbols may correspond to OFDM symbols. For example, the symbols may correspond to resource block units. For example, the symbols may correspond to resource elements.

Two antenna ports are said to be QCL (Quasi Co-Located) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

Carrier aggregation may be communication using a plurality of aggregated serving cells. Carrier aggregation may be communication using a plurality of aggregated component carriers. Carrier aggregation may be communication using a plurality of aggregated downlink component carriers. Carrier aggregation may be communication using a plurality of aggregated uplink component carriers.

Figure 5:
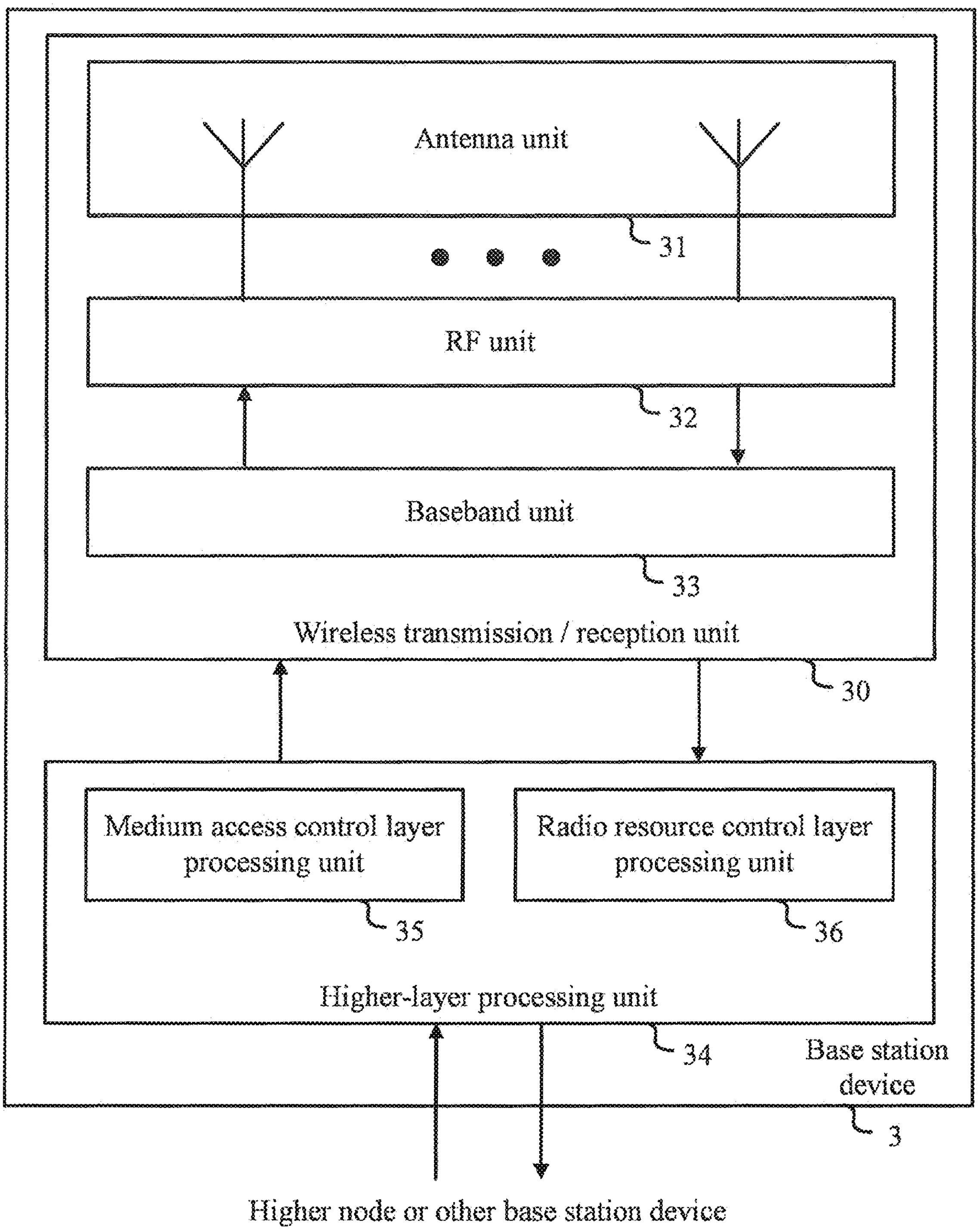
FIG. 5 is a schematic block diagram showing a configuration example of the base station device 3 according to an aspect of the present embodiment.

FIG. 5 is a schematic block diagram showing a configuration example of the base station device 3 according to an aspect of the present embodiment. As shown in FIG. 5, the base station device 3 includes at least a part of or all the wireless transmission/reception unit (physical layer processing unit) 30 and the higher-layer processing unit 34. The wireless transmission/reception unit 30 includes at least a part of or all the antenna unit 31, the RF unit 32 (Radio Frequency unit 32), and the baseband unit 33. The higher-layer processing unit 34 includes at least a part of or all the medium access control layer processing unit 35 and the radio resource control (RRC: Radio Resource Control) layer processing unit 36.

The wireless transmission/reception unit 30 includes at least a part of or all a wireless transmission unit **30*a* and a wireless reception unit 30*b*. The configuration of the baseband unit 33 included in the wireless transmission unit 30*a* and the configuration of the baseband unit 33 included in the wireless reception unit 30*b* may be the same or different. The configuration of the RF unit 32 included in the wireless transmission unit 30*a* and the configuration of the RF unit 32 included in the wireless reception unit 30*b* may be the same or different. The configuration of the antenna unit 31 included in the wireless transmission unit 30*a* and the configuration of the antenna unit 31 included in the wireless reception unit 30*b*** may be the same or different.

The higher-layer processing unit 34 provides downlink data (a transport block) to the wireless transmission/reception unit 30 (or the wireless transmission unit **30*a*). The higher-layer processing unit 34** performs processing of a medium access control (MAC) layer, a packet data convergence protocol layer (PDCP layer), a radio link control layer (RLC layer) and/or an RRC layer.

The medium access control layer processing unit 35 included in the higher-layer processing unit 34 performs processing of the MAC layer.

The radio resource control layer processing unit 36 included in the higher-layer processing unit 34 performs the process of the RRC layer. The radio resource control layer processing unit 36 manages various configuration information/parameters (RRC parameters) of the terminal device 1. The radio resource control layer processing unit 36 configures an RRC parameter based on the RRC message received from the terminal device 1.

The wireless transmission/reception unit 30 (or the wireless transmission unit **30*a*) performs processing such as encoding and modulation. The wireless transmission/reception unit 30 (or the wireless transmission unit 30*a*) generates a physical signal by encoding and modulating the downlink data. The wireless transmission/reception unit 30 (or the wireless transmission unit 30*a*) converts OFDM symbols in the physical signal to a baseband signal by conversion to a time-continuous signal. The wireless transmission/reception unit 30 (or the wireless transmission unit 30*a*) transmits the baseband signal (or the physical signal) to the terminal device 1 via radio frequency. The wireless transmission/reception unit 30 (or the wireless transmission unit 30*a*) may arrange the baseband signal (or the physical signal) on a component carrier and transmit the baseband signal (or the physical signal) to the terminal device 1**.

The wireless transmission/reception unit 30 (or the wireless reception unit **30*b*) performs processing such as demodulation and decoding. The wireless transmission/reception unit 30 (or the wireless reception unit 30*b*) separates, demodulates and decodes the received physical signal, and provides the decoded information to the higher-layer processing unit 34. The wireless transmission/reception unit 30 (or the wireless reception unit 30***b*) may perform the channel access procedure prior to the transmission of the physical signal.

The RF unit 32 demodulates the physical signal received via the antenna unit 31 into a baseband signal (down convert), and/or removes extra frequency components. The RF unit 32 provides the processed analog signal to the baseband unit 33.

The baseband unit 33 converts an analog signal (signals on radio frequency) input from the RF unit 32 into a digital signal (a baseband signal). The baseband unit 33 separates a portion which corresponds to CP (Cyclic Prefix) from the digital signal. The baseband unit 33 performs Fast Fourier Transformation (FFT) on the digital signal from which the CP has been removed. The baseband unit 33 provides the physical signal in the frequency domain.

The baseband unit 33 performs Inverse Fast Fourier Transformation (IFFT) on downlink data to generate an OFDM symbol, adds a CP to the generated OFDM symbol, generates a digital signal (baseband signal), and convert the digital signal into an analog signal. The baseband unit 33 provides the analog signal to the RF unit 32.

The RF unit 32 removes extra frequency components from the analog signal (signals on radio frequency) input from the baseband unit 33, up-converts the analog signal to a radio frequency, and transmits it via the antenna unit 31. The RF unit 32 may have a function of controlling transmission power. The RF unit 32 is also referred to as a transmission power control unit.

At least one or more serving cells (or one or more component carriers, one or more downlink component carriers, one or more uplink component carriers) may be configured for the terminal device 1.

Each of the serving cells set for the terminal device 1 may be any of PCell (Primary cell), PSCell (Primary SCG cell), and SCell (Secondary Cell).

A PCell is a serving cell included in a MCG (Master Cell Group). A PCell is a cell (implemented cell) which performs an initial connection establishment procedure or a connection re-establishment procedure by the terminal device 1.

A PSCell is a serving cell included in a SCG (Secondary Cell Group). A PSCell is a serving cell in which random-access is performed by the terminal device 1 in a reconfiguration procedure with synchronization (Reconfiguration with synchronization).

A SCell may be included in either a MCG or a SCG.

The serving cell group (cell group) is a designation including at least MCG and SCG. The serving cell group may include one or more serving cells (or one or more component carriers). One or more serving cells (or one or more component carriers) included in the serving cell group may be operated by carrier aggregation.

One or more downlink BWPs may be configured for each serving cell (or each downlink component carrier). One or more uplink BWPs may be configured for each serving cell (or each uplink component carrier).

Among the one or more downlink BWPs set for the serving cell (or the downlink component carrier), one downlink BWP may be set as an active downlink BWP (or one downlink BWP may be activated). Among the one or more uplink BWPs set for the serving cell (or the uplink component carrier), one uplink BWP may be set as an active uplink BWP (or one uplink BWP may be activated).

A PDSCH, a PDCCH, and a CSI-RS may be received in the active downlink BWP. The terminal device 1 may receive the PDSCH, the PDCCH, and the CSI-RS in the active downlink BWP. A PUCCH and a PUSCH may be sent on the active uplink BWP. The terminal device 1 may transmit the PUCCH and the PUSCH in the active uplink BWP. The active downlink BWP and the active uplink BWP are also referred to as active BWP.

The PDSCH, the PDCCH, and the CSI-RS may not be received in downlink BWPs (inactive downlink BWPs) other than the active downlink BWP. The terminal device 1 may not receive the PDSCH, the PDCCH, and the CSI-RS in the downlink BWPs which are other than the active downlink BWP. The PUCCH and the PUSCH do not need to be transmitted in uplink BWPs (inactive uplink BWPs) other than the active uplink BWP. The terminal device 1 may not transmit the PUCCH and the PUSCH in the uplink BWPs which is other than the active uplink BWP. The inactive downlink BWP and the inactive uplink BWP are also referred to as inactive BWP.

Downlink BWP switching deactivates an active downlink BWP and activates one of inactive downlink BWPs which are other than the active downlink BWP. The downlink BWP switching may be controlled by a BWP field included in a downlink control information. The downlink BWP switching may be controlled based on higher-layer parameters.

Uplink BWP switching is used to deactivate an active uplink BWP and activate any inactive uplink BWP which is other than the active uplink BWP. Uplink BWP switching may be controlled by a BWP field included in a downlink control information. The uplink BWP switching may be controlled based on higher-layer parameters.

Among the one or more downlink BWPs set for the serving cell, two or more downlink BWPs may not be set as active downlink BWPs. For the serving cell, one downlink BWP may be active at a certain time.

Among the one or more uplink BWPs set for the serving cell, two or more uplink BWPs may not be set as active uplink BWPs. For the serving cell, one uplink BWP may be active at a certain time.

Figure 6:
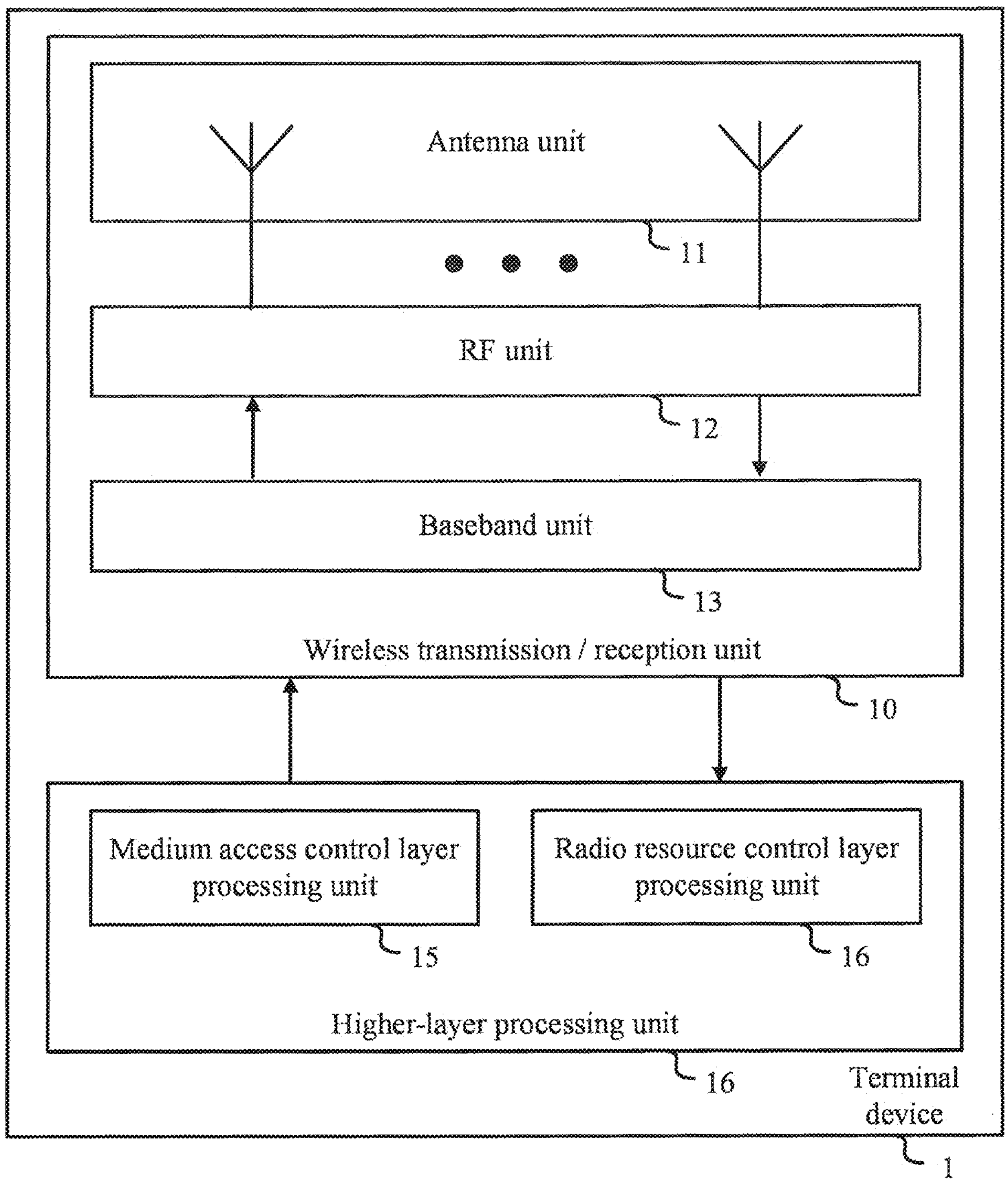
FIG. 6 is a schematic block diagram showing a configuration example of the terminal device 1 according to an aspect of the present embodiment.

FIG. 6 is a schematic block diagram showing a configuration example of the terminal device 1 according to an aspect of the present embodiment. As shown in FIG. 6, the terminal device 1 includes at least a part of or all the wireless transmission/reception unit (physical layer processing unit) 10 and the higher-layer processing unit 14. The wireless transmission/reception unit 10 includes at least a part of or all the antenna unit 11, the RF unit 12, and the baseband unit 13. The higher-layer processing unit 14 includes at least a part of or all the medium access control layer processing unit 15 and the radio resource control layer processing unit 16.

The wireless transmission/reception unit 10 includes at least a part of or all a wireless transmission unit 10*a* and a wireless reception unit 10*b*. The configuration of the baseband unit 13 included in the wireless transmission unit 10*a* and the configuration of the baseband unit 13 included in the wireless reception unit 10*b* may be the same or different. The configuration of the RF unit 12 included in the wireless transmission unit 10*a* and the RF unit 12 included in the wireless reception unit 10*b* may be the same or different. The configuration of the antenna unit 11 included in the wireless transmission unit 10*a* and the configuration of the antenna unit 11 included in the wireless reception unit 10*b* may be the same or different.

The higher-layer processing unit 14 provides uplink data (a transport block) to the wireless transmission/reception unit 10 (or the wireless transmission unit 10*a*). The higher-layer processing unit 14 performs processing of a MAC layer, a packet data integration protocol layer, a radio link control layer, and/or an RRC layer.

The medium access control layer processing unit 15 included in the higher-layer processing unit 14 performs processing of the MAC layer.

The radio resource control layer processing unit 16 included in the higher-layer processing unit 14 performs the process of the RRC layer. The radio resource control layer processing unit 16 manages various configuration information/parameters (RRC parameters) of the terminal device 1. The radio resource control layer processing unit 16 configures RRC parameters based on the RRC message received from the base station device 3.

The wireless transmission/reception unit 10 (or the wireless transmission unit 10*a*) performs processing such as encoding and modulation. The wireless transmission/reception unit 10 (or the wireless transmission unit 10*a*) generates a physical signal by encoding and modulating the uplink data. The wireless transmission/reception unit 10 (or the wireless transmission unit 10*a*) converts OFDM symbols in the physical signal to a baseband signal by conversion to a time-continuous signal. The wireless transmission/reception unit 10 (or the wireless transmission unit 10*a*) transmits the baseband signal (or the physical signal) to the base station device 3 via radio frequency. The wireless transmission/reception unit 10 (or the wireless transmission unit 10*a*) may arrange the baseband signal (or the physical signal) on a BWP (active uplink BWP) and transmit the baseband signal (or the physical signal) to the base station device 3.

The wireless transmission/reception unit 10 (or the wireless reception unit 10*b*) performs processing such as demodulation and decoding. The wireless transmission/reception unit 10 (or the wireless reception unit 10*b*) may receive a physical signal in a BWP (active downlink BWP) of a serving cell. The wireless transmission/reception unit 10 (or the wireless reception unit 10*b*) separates, demodulates and decodes the received physical signal, and provides the decoded information to the higher-layer processing unit 14. The wireless transmission/reception unit 10 (or the wireless reception unit 10*b*) may perform the channel access procedure prior to the transmission of the physical signal.

The RF unit 12 demodulates the physical signal received via the antenna unit 11 into a baseband signal (down convert), and/or removes extra frequency components. The RF unit 12 provides the processed analog signal to the baseband unit 13.

The baseband unit 13 converts an analog signal (signals on radio frequency) input from the RF unit 12 into a digital signal (a baseband signal). The baseband unit 13 separates a portion which corresponds to CP from the digital signal, performs fast Fourier transformation on the digital signal from which the CP has been removed, and provides the physical signal in the frequency domain.

The baseband unit 13 performs inverse fast Fourier transformation on uplink data to generate an OFDM symbol, adds a CP to the generated OFDM symbol, generates a digital signal (baseband signal), and convert the digital signal into an analog signal. The baseband unit 13 provides the analog signal to the RF unit 12.

The RF unit 12 removes extra frequency components from the analog signal (signals on radio frequency) input from the baseband unit 13, up-converts the analog signal to a radio frequency, and transmits it via the antenna unit 11 The RF unit 12 may have a function of controlling transmission power. The RF unit 12 is also referred to as a transmission power control unit.

Hereinafter, physical signals (signals) will be described.

Physical signal is a generic term for downlink physical channels, downlink physical signals, uplink physical signals, and uplink physical channels. The physical channel is a generic term for downlink physical channels and uplink physical channels.

An uplink physical channel may correspond to a set of resource elements that carry information originating from the higher-layer and/or uplink control information. The uplink physical channel may be a physical channel used in an uplink component carrier. The uplink physical channel may be transmitted by the terminal device 1. The uplink physical channel may be received by the base station device 3. In the wireless communication system according to one aspect of the present embodiment, at least part or all of PUCCH (Physical Uplink Control CHannel), PUSCH (Physical Uplink Shared CHannel), and PRACH (Physical Random Access CHannel) may be used.

A PUCCH may be used to transmit uplink control information (UCI: Uplink Control Information). The PUCCH may be sent to deliver (transmission, convey) uplink control information. The uplink control information may be mapped to (or arranged in) the PUCCH. The terminal device 1 may transmit PUCCH in which uplink control information is arranged. The base station device 3 may receive the PUCCH in which the uplink control information is arranged.

Uplink control information (uplink control information bit, uplink control information sequence, uplink control information type) includes at least part or all of channel state information (CSI: Channel State Information), scheduling request (SR: Scheduling Request), and HARQ-ACK (Hybrid Automatic Repeat request ACKnowledgement).

Channel state information is conveyed by using channel state information bits or a channel state information sequence. Scheduling request is also referred to as a scheduling request bit or a scheduling request sequence. HARQ-ACK information is also referred to as a HARQ-ACK information bit or a HARQ-ACK information sequence.

HARQ-ACK information may include HARQ-ACK status which corresponds to a transport block (TB: Transport block, MAC PDU: Medium Access Control Protocol Data Unit, DL-SCH: Downlink-Shared Channel, UL-SCH: Uplink-Shared Channel, PDSCH: Physical Downlink Shared CHannel, PUSCH: Physical Uplink Shared CHannel). The HARQ-ACK status may indicate ACK (acknowledgement) or NACK (negative-acknowledgement) corresponding to the transport block. The ACK may indicate that the transport block has been successfully decoded. The NACK may indicate that the transport block has not been successfully decoded. The HARQ-ACK information may include a HARQ-ACK codebook that includes one or more HARQ-ACK status (or HARQ-ACK bits).

For example, the correspondence between the HARQ-ACK information and the transport block may mean that the HARQ-ACK information and the PDSCH used for transmission of the transport block correspond.

HARQ-ACK status may indicate ACK or NACK which correspond to one CBG (Code Block Group) included in the transport block.

The scheduling request may at least be used to request PUSCH (or UL-SCH) resources for new transmission. The scheduling request may be used to indicate either a positive SR or a negative SR. The fact that the scheduling request indicates a positive SR is also referred to as "a positive SR is sent". The positive SR may indicate that the PUSCH (or UL-SCH) resource for initial transmission is requested by the terminal device 1. A positive SR may indicate that a higher-layer is to trigger a scheduling request. The positive SR may be sent when the higher-layer instructs to send a scheduling request. The fact that the scheduling request bit indicates a negative SR is also referred to as "a negative SR is sent". A negative SR may indicate that the PUSCH (or UL-SCH) resource for initial transmission is not requested by the terminal device 1. A negative SR may indicate that the higher-layer does not trigger a scheduling request. A negative SR may be sent if the higher-layer is not instructed to send a scheduling request.

The channel state information may include at least part of or all a channel quality indicator (CQI), a precoder matrix indicator (PMI), and a rank indicator (RI). CQI is an indicator related to channel quality (e.g., propagation quality) or physical channel quality, and PMI is an indicator related to a precoder. RI is an indicator related to transmission rank (or the number of transmission layers).

Channel state information may be provided at least based on receiving one or more physical signals (e.g., one or more CSI-RSs) used at least for channel measurement. The channel state information may be selected by the terminal device 1 at least based on receiving one or more physical signals used for channel measurement. Channel measurements may include interference measurements.

A PUCCH may correspond to a PUCCH format. A PUCCH may be a set of resource elements used to convey a PUCCH format. A PUCCH may include a PUCCH format. A PUCCH format may include UCI.

A PUSCH may be used to transmit uplink data (a transport block) and/or uplink control information. A PUSCH may be used to transmit uplink data (a transport block) corresponding to a UL-SCH and/or uplink control information. A PUSCH may be used to convey uplink data (a transport block) and/or uplink control information. A PUSCH may be used to convey uplink data (a transport block) corresponding to a UL-SCH and/or uplink control information. Uplink data (a transport block) may be arranged in a PUSCH. Uplink data (a transport block) corresponding to UL-SCH may be arranged in a PUSCH. Uplink control information may be arranged to a PUSCH. The terminal device 1 may transmit a PUSCH in which uplink data (a transport block) and/or uplink control information is arranged. The base station device 3 may receive a PUSCH in which uplink data (a transport block) and/or uplink control information is arranged.

UL DMRS is a generic name of a DMRS for a PUSCH and a DMRS for a PUCCH.

A set of antenna ports of a DMRS for a PUSCH (a DMRS associated with a PUSCH, a DMRS included in a PUSCH, a DMRS which corresponds to a PUSCH) may be given based on a set of antenna ports for the PUSCH. That is, the set of DMRS antenna ports for the PUSCH may be the same as the set of antenna ports for the PUSCH.

Transmission of a PUSCH and transmission of a DMRS for the PUSCH may be indicated (or scheduled) by one DCI format. The PUSCH and the DMRS for the PUSCH may be collectively referred to as a PUSCH. Transmission of the PUSCH may be transmission of the PUSCH and the DMRS for the PUSCH.

A PUSCH may be estimated from a DMRS for the PUSCH. That is, propagation path of the PUSCH may be estimated from the DMRS for the PUSCH.

A set of antenna ports of a DMRS for a PUCCH (a DMRS associated with a PUCCH, a DMRS included in a PUCCH, a DMRS which corresponds to a PUCCH) may be identical to a set of antenna ports for the PUCCH.

Transmission of a PUCCH and transmission of a DMRS for the PUCCH may be indicated (or triggered) by one DCI format. The arrangement of the PUCCH in resource elements (resource element mapping) and/or the arrangement of the DMRS in resource elements for the PUCCH may be provided at least by one PUCCH format. The PUCCH and the DMRS for the PUCCH may be collectively referred to as PUCCH. Transmission of the PUCCH may be transmission of the PUCCH and the DMRS for the PUCCH.

A PUCCH may be estimated from a DMRS for the PUCCH. That is, propagation path of the PUCCH may be estimated from the DMRS for the PUCCH.

A downlink physical channel may correspond to a set of resource elements that carry information originating from the higher-layer and/or downlink control information. The downlink physical channel may be a physical channel used in the downlink component carrier. The base station device 3 may transmit the downlink physical channel. The terminal device 1 may receive the downlink physical channel. In the wireless communication system according to one aspect of the present embodiment, at least a part of or all PBCH (Physical Broadcast Channel), PDCCH (Physical Downlink Control Channel), and PDSCH (Physical Downlink Shared Channel) may be used.

The PBCH may be used to transmit a MIB (Master Information Block) and/or physical layer control information. The physical layer control information is a kind of downlink control information. The PBCH may be sent to deliver the MIB and/or the physical layer control information. A BCH may be mapped (or corresponding) to the PBCH. The terminal device 1 may receive the PBCH. The base station device 3 may transmit the PBCH. The physical layer control information is also referred to as a PBCH payload and a PBCH payload related to timing. The MIB may include one or more higher-layer parameters.

Physical layer control information includes 8 bits. The physical layer control information may include at least part or all of 0A to 0D. The 0A is radio frame information. The 0B is half radio frame information (half system frame information). The 0C is SS/PBCH block index information. The 0D is subcarrier offset information.

The radio frame information is used to indicate a radio frame in which the PBCH is transmitted (a radio frame including a slot in which the PBCH is transmitted). The radio frame information is represented by 4 bits. The radio frame information may be represented by 4 bits of a radio frame indicator. The radio frame indicator may include 10 bits. For example, the radio frame indicator may at least be used to identify a radio frame from index 0 to index 1023.

The half radio frame information is used to indicate whether the PBCH is transmitted in first five subframes or in second five subframes among radio frames in which the PBCH is transmitted. Here, the half radio frame may be configured to include five subframes. The half radio frame may be configured by five subframes of the first half of ten subframes included in the radio frame. The half radio frame may be configured by five subframes in the second half of ten subframes included in the radio frame.

The SS/PBCH block index information is used to indicate an SS/PBCH block index. The SS/PBCH block index information may be represented by 3 bits. The SS/PBCH block index information may consist of 3 bits of an SS/PBCH block index indicator. The SS/PBCH block index indicator may include 6 bits. The SS/PBCH block index indicator may at least be used to identify an SS/PBCH block from index 0 to index 63 (or from index 0 to index 3, from index 0 to index 7, from index 0 to index 9, from index 0 to index 19, etc.).

The subcarrier offset information is used to indicate subcarrier offset. The subcarrier offset information may be used to indicate the difference between the first subcarrier in which the PBCH is arranged and the first subcarrier in which the control resource set with index 0 is arranged.

A PDCCH may be used to transmit downlink control information (DCI). A PDCCH may be transmitted to deliver downlink control information. Downlink control information may be mapped to a PDCCH. The terminal device 1 may receive a PDCCH in which downlink control information is arranged. The base station device 3 may transmit the PDCCH in which the downlink control information is arranged.

Downlink control information may correspond to a DCI format. Downlink control information may be included in a DCI format. Downlink control information may be arranged in each field of a DCI format.

DCI format is a generic name for DCI format 0_0, DCI format 0_1, DCI format 1_0, and DCI format 1_1. Uplink DCI format is a generic name of the DCI format 0_0 and the DCI format 0_1. Downlink DCI format is a generic name of the DCI format 1_0 and the DCI format 1_1.

The DCI format 0_0 is at least used for scheduling a PUSCH for a cell (or a PUSCH arranged on a cell). The DCI format 0_0 includes at least a part of or all fields 1A to 1E. The 1A is a DCI format identification field (Identifier field for DCI formats). The 1B is a frequency domain resource assignment field (FDRA field). The 1C is a time domain resource assignment field (TDRA field). The 1D is a frequency-hopping flag field. The 1E is an MCS field (Modulation-and-Coding-Scheme field).

The DCI format identification field may indicate whether the DCI format including the DCI format identification field is an uplink DCI format or a downlink DCI format. The DCI format identification field included in the DCI format 0_0 may indicate 0 (or may indicate that the DCI format 0_0 is an uplink DCI format).

The frequency domain resource assignment field included in the DCI format 0_0 may be at least used to indicate the assignment (allocation) of frequency resources for a PUSCH. The frequency domain resource assignment field included in the DCI format 0_0 may be at least used to indicate the assignment (allocation) of frequency resources for a PUSCH scheduled by the DCI format 0_0.

The time domain resource assignment field included in the DCI format 0_0 may be at least used to indicate the assignment of time resources for a PUSCH. The time domain resource assignment field included in the DCI format 0_0 may be at least used to indicate the assignment of time resources for a PUSCH scheduled by the DCI format 0_0.

The frequency-hopping flag field may be at least used to indicate whether frequency-hopping is applied to a PUSCH. The frequency-hopping flag field may be at least used to indicate whether frequency-hopping is applied to a PUSCH scheduled by the DCI format 0_0.

The MCS field included in the DCI format 0_0 may be at least used to indicate a modulation scheme for a PUSCH and/or a part of or all a target coding rate for the PUSCH. The MCS field included in the DCI format 0_0 may be at least used to indicate a modulation scheme for a PUSCH scheduled by the DCI format 0_0 and/or a part of or all a target coding rate for the PUSCH. A size of a transport block (TBS: Transport Block Size) of a PUSCH may be given based at least on a target coding rate and a part of or all a modulation scheme for the PUSCH.

The DCI format 0_0 may not include fields used for a CSI request. That is, CSI may not be requested by the DCI format 0_0.

The DCI format 0_0 may not include a carrier indicator field. An uplink component carrier on which a PUSCH scheduled by the DCI format 0_0 is arranged may be the same as an uplink component carrier on which a PDCCH including the DCI format 0_0 is arranged.

The DCI format 0_0 may not include a BWP field. An uplink BWP on which a PUSCH scheduled by the DCI format 0_0 is arranged may be the same as an uplink BWP on which a PDCCH including the DCI format 0_0 is arranged.

The DCI format 0_1 is at least used for scheduling of a PUSCH for a cell (or arranged on a cell). The DCI format 0_1 includes at least a part of or all fields 2A to 2H. The 2A is a DCI format identification field. The 2B is a frequency domain resource assignment field. The 2C is a time domain resource assignment field. The 2D is a frequency-hopping flag field. The 2E is an MCS field. The 2F is a CSI request field. The 2G is a BWP field. The 2H is a carrier indicator field.

The DCI format identification field included in the DCI format 0_1 may indicate 0 (or may indicate that the DCI format 0_1 is an uplink DCI format).

The frequency domain resource assignment field included in the DCI format 0_1 may be at least used to indicate the assignment of frequency resources for a PUSCH. The frequency domain resource assignment field included in the DCI format 0_1 may be at least used to indicate the assignment of frequency resources for a PUSCH scheduled by the DCI format.

The time domain resource assignment field included in the DCI format 0_1 may be at least used to indicate the assignment of time resources for a PUSCH. The time domain resource assignment field included in DCI format 0_1 may be at least used to indicate the assignment of time resources for a PUSCH scheduled by the DCI format 0_1.

The frequency-hopping flag field may be at least used to indicate whether frequency-hopping is applied to a PUSCH scheduled by the DCI format 0_1.

The MCS field included in the DCI format 0_1 may be at least used to indicate a modulation scheme for a PUSCH and/or a part of or all a target coding rate for the PUSCH. The MCS field included in the DCI format 0_1 may be at least used to indicate a modulation scheme for a PUSCH scheduled by the DCI format and/or part or all of a target coding rate for the PUSCH.

When the DCI format 0_1 includes the BWP field, the BWP field may be used to indicate an uplink BWP on which a PUSCH scheduled by the DCI format 0_1 is arranged. When the DCI format 0_1 does not include the BWP field, an uplink BWP on which a PUSCH is arranged may be the active uplink BWP. When a number of uplink BWPs configured in the terminal device 1 in an uplink component carrier is two or more, a number of bits for the BWP field included in the DCI format 0_1 used for scheduling a PUSCH arranged on the uplink component carrier may be one or more. When a number of uplink BWPs configured in the terminal device 1 in an uplink component carrier is one, a number of bits for the BWP field included in the DCI format 0_1 used for scheduling a PUSCH arranged on the uplink component carrier may be zero.

The DCI format 0_0 may include a ChannelAccess-CPext field. The ChannelAccess-CPext field may indicate channel access type and/or CP extension. For example, the ChannelAccess-CPext field may indicate combinations of channel access type and CP extension. The ChannelAccess-CPext field may be 0 bit, 2 bits, or more than 2 bits.

The CSI request field is at least used to indicate CSI reporting.

If the DCI format 0_1 includes the carrier indicator field, the carrier indicator field may be used to indicate an uplink component carrier (or a serving cell) on which a PUSCH is arranged. When the DCI format 0_1 does not include the carrier indicator field, a serving cell on which a PUSCH is arranged may be the same as the serving cell on which a PDCCH including the DCI format 0_1 used for scheduling of the PUSCH is arranged. When a number of uplink component carriers (or a number of serving cells) configured in the terminal device 1 in a serving cell group is two or more (when uplink carrier aggregation is operated in a serving cell group), or when cross-carrier scheduling is configured for the serving cell group, a number of bits for the carrier indicator field included in the DCI format 0_1 used for scheduling a PUSCH arranged on the serving cell group may be one or more (e.g., 3). When a number of uplink component carriers (or a number of serving cells) configured in the terminal device 1 in a serving cell group is one (or when uplink carrier aggregation is not operated in a serving cell group), or when the cross-carrier scheduling is not configured for the serving cell group, a number of bits for the carrier indicator field included in the DCI format 0_1 used for scheduling of a PUSCH arranged on the serving cell group may be zero.

The DCI format 1_0 is at least used for scheduling of a PDSCH for a cell (arranged on a cell). The DCI format 1_0 includes at least a part of or all fields 3A to 3F. The 3A is a DCI format identification field. The 3B is a frequency domain resource assignment field. The 3C is a time domain resource assignment field. The 3D is an MCS field. The 3E is a PDSCH-to-HARQ-feedback indicator field. The 3F is a PUCCH resource indicator field.

The DCI format identification field included in the DCI format 1_0 may indicate 1 (or may indicate that the DCI format 1_0 is a downlink DCI format).

The frequency domain resource assignment field included in the DCI format 1_0 may be at least used to indicate the assignment of frequency resources for a PDSCH. The frequency domain resource assignment field included in the DCI format 1_0 may be at least used to indicate the assignment of frequency resources for a PDSCH scheduled by the DCI format 1_0.

The time domain resource assignment field included in the DCI format 1_0 may be at least used to indicate the assignment of time resources for a PDSCH. The time domain resource assignment field included in the DCI format 1_0 may be at least used to indicate the assignment of time resources for a PDSCH scheduled by the DCI format 1_0.

The MCS field included in the DCI format 1_0 may be at least used to indicate a modulation scheme for a PDSCH and/or a part of or all a target coding rate for the PDSCH. The MCS field included in the DCI format 1_0 may be at least used to indicate a modulation scheme for a PDSCH scheduled by the DCI format 1_0 and/or a part of or all a target coding rate for the PDSCH. A size of a transport block (TBS: Transport Block Size) of a PDSCH may be given based at least on a target coding rate and a part of or all a modulation scheme for the PDSCH.

The PDSCH-to-HARQ-feedback timing indicator field may be at least used to indicate the offset (K1) from a slot in which the last OFDM symbol of a PDSCH scheduled by the DCI format 1_0 is included to another slot in which the first OFDM symbol of a PUCCH triggered by the DCI format 1_0 is included.

The PUCCH resource indicator field may be a field indicating an index of any one or more PUCCH resources included in the PUCCH resource set for a PUCCH transmission. The PUCCH resource set may include one or more PUCCH resources. The PUCCH resource indicator field may trigger PUCCH transmission with a PUCCH resource indicated at least based on the PUCCH resource indicator field.

The DCI format 1_0 may not include the carrier indicator field. A downlink component carrier on which a PDSCH scheduled by the DCI format 1_0 is arranged may be the same as a downlink component carrier on which a PDCCH including the DCI format 1_0 is arranged.

The DCI format 1_0 may not include the BWP field. A downlink BWP on which a PDSCH scheduled by a DCI format 1_0 is arranged may be the same as a downlink BWP on which a PDCCH including the DCI format 1_0 is arranged.

The DCI format 1_1 is at least used for scheduling of a PDSCH for a cell (or arranged on a cell). The DCI format 1_1 includes at least a part of or all fields 4A to 4H. The 4A is a DCI format identification field. The 4B is a frequency domain resource assignment field. The 4C is a time domain resource assignment field. The 4D is an MCS field. The 4E is a PDSCH-to-HARQ-feedback indicator field. The 4F is a PUCCH resource indicator field. The 4G is a BWP field. The 4H is a carrier indicator field.

The DCI format identification field included in the DCI format 1_1 may indicate 1 (or may indicate that the DCI format 1_1 is a downlink DCI format).

The frequency domain resource assignment field included in the DCI format 1_1 may be at least used to indicate the assignment of frequency resources for a PDSCH. The frequency domain resource assignment field included in the DCI format 1_0 may be at least used to indicate the assignment of frequency resources for a PDSCH scheduled by the DCI format 1_1.

The time domain resource assignment field included in the DCI format 1_1 may be at least used to indicate the assignment of time resources for a PDSCH. The time domain resource assignment field included in the DCI format 1_1 may be at least used to indicate the assignment of time resources for a PDSCH scheduled by the DCI format 1_1.

The MCS field included in the DCI format 1_1 may be at least used to indicate a modulation scheme for a PDSCH and/or a part of or all a target coding rate for the PDSCH. The MCS field included in the DCI format 1_1 may be at least used to indicate a modulation scheme for a PDSCH scheduled by the DCI format 1_1 and/or a part of or all a target coding rate for the PDSCH.

When the DCI format 1_1 includes a PDSCH-to-HARQ-feedback timing indicator field, the PDSCH-to-HARQ-feedback timing indicator field indicates an offset (K1) from a slot including the last OFDM symbol of a PDSCH scheduled by the DCI format 1_1 to another slot including the first OFDM symbol of a PUCCH triggered by the DCI format 1_1. When the DCI format 1_1 does not include the PDSCH-to-HARQ-feedback timing indicator field, an offset from a slot in which the last OFDM symbol of a PDSCH scheduled by the DCI format 1_1 is included to another slot in which the first OFDM symbol of a PUCCH triggered by the DCI format 1_1 is identified by a higher-layer parameter.

When the DCI format 1_1 includes the BWP field, the BWP field may be used to indicate a downlink BWP on which a PDSCH scheduled by the DCI format 1_1 is arranged. When the DCI format 1_1 does not include the BWP field, a downlink BWP on which a PDSCH is arranged may be the active downlink BWP. When a number of downlink BWPs configured in the terminal device 1 in a downlink component carrier is two or more, a number of bits for the BWP field included in the DCI format 1_1 used for scheduling a PDSCH arranged on the downlink component carrier may be one or more. When a number of downlink BWPs configured in the terminal device 1 in a downlink component carrier is one, a number of bits for the BWP field included in the DCI format 1_1 used for scheduling a PDSCH arranged on the downlink component carrier may be zero.

If the DCI format 1_1 includes the carrier indicator field, the carrier indicator field may be used to indicate a downlink component carrier (or a serving cell) on which a PDSCH is arranged. When the DCI format 1_1 does not include the carrier indicator field, a downlink component carrier (or a serving cell) on which a PDSCH is arranged may be the same as a downlink component carrier (or a serving cell) on which a PDCCH including the DCI format 1_1 used for scheduling of the PDSCH is arranged. When a number of downlink component carriers (or a number of serving cells) configured in the terminal device 1 in a serving cell group is two or more (when downlink carrier aggregation is operated in a serving cell group), or when cross-carrier scheduling is configured for the serving cell group, a number of bits for the carrier indicator field included in the DCI format 1_1 used for scheduling a PDSCH arranged on the serving cell group may be one or more (e.g., 3). When a number of downlink component carriers (or a number of serving cells) configured in the terminal device 1 in a serving cell group is one (or when downlink carrier aggregation is not operated in a serving cell group), or when the cross-carrier scheduling is not configured for the serving cell group, a number of bits for the carrier indicator field included in the DCI format 1_1 used for scheduling of a PDSCH arranged on the serving cell group may be zero.

A PDSCH may be used to transmit one or more transport blocks. A PDSCH may be used to transmit one or more transport blocks which corresponds to a DL-SCH. A PDSCH may be used to convey one or more transport blocks. A PDSCH may be used to convey one or more transport blocks which corresponds to a DL-SCH. One or more transport blocks may be arranged in a PDSCH. One or more transport blocks which corresponds to a DL-SCH may be arranged in a PDSCH. The base station device 3 may transmit a PDSCH. The terminal device 1 may receive the PDSCH.

Downlink physical signals may correspond to a set of resource elements. The downlink physical signals may not carry the information generated in the higher-layer. The downlink physical signals may be physical signals used in the downlink component carrier. A downlink physical signal may be transmitted by the base station device 3. The downlink physical signal may be transmitted by the terminal device 1. In the wireless communication system according to one aspect of the present embodiment, at least a part of or all an SS (Synchronization signal), DL DMRS (DownLink DeModulation Reference Signal), CSI-RS (Channel State Information-Reference Signal), and DL PTRS (DownLink Phase Tracking Reference Signal) may be used.

The synchronization signal may be used at least for the terminal device 1 to synchronize in the frequency domain and/or time domain for downlink. The synchronization signal is a generic name of PSS (Primary Synchronization Signal) and SSS (Secondary Synchronization Signal).

Figure 7:
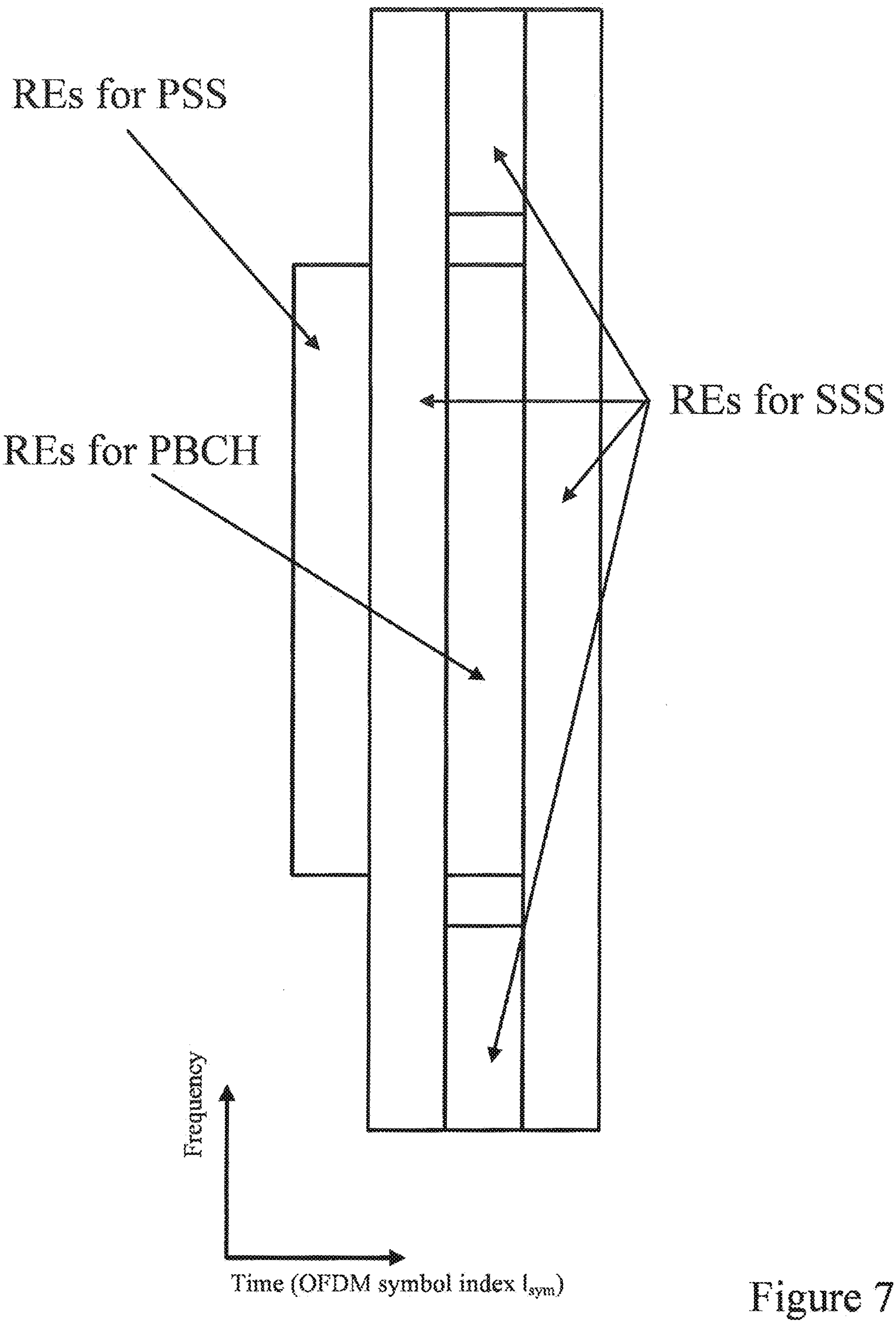
FIG. 7 is a diagram showing a configuration example of an SS/PBCH block according to an aspect of the present embodiment.

FIG. 7 is a diagram showing a configuration example of an SS/PBCH block according to an aspect of the present embodiment. In FIG. 7, the horizontal axis indicates time domain (OFDM symbol index $l_{sym}$), and the vertical axis indicates frequency domain. The shaded blocks indicate a set of resource elements for a PSS. The blocks of grid lines indicate a set of resource elements for an SSS. Also, the blocks in the horizontal line indicate a set of resource elements for a PBCH and a set of resource elements for a DMRS for the PBCH (DMRS related to the PBCH, DMRS included in the PBCH, DMRS which corresponds to the PBCH).

As shown in FIG. 7, the SS/PBCH block includes a PSS, an SSS, and a PBCH. The SS/PBCH block includes 4 consecutive OFDM symbols. The SS/PBCH block includes 240 subcarriers. The PSS is allocated to the 57th to 183rd subcarriers in the first OFDM symbol. The SSS is allocated to the 57th to 183rd subcarriers in the third OFDM symbol. The first to 56th subcarriers of the first OFDM symbol may be set to zero. The 184th to 240th subcarriers of the first OFDM symbol may be set to zero. The 49th to 56th subcarriers of the third OFDM symbol may be set to zero. The 184th to 192nd subcarriers of the third OFDM symbol may be set to zero. In the first to 240th subcarriers of the second OFDM symbol, the PBCH is allocated to subcarriers in which the DMRS for the PBCH is not allocated. In the first to 48th subcarriers of the third OFDM symbol, the PBCH is allocated to subcarriers in which the DMRS for the PBCH is not allocated. In the 193rd to 240th subcarriers of the third OFDM symbol, the PBCH is allocated to subcarriers in which the DMRS for the PBCH is not allocated. In the first to 240th subcarriers of the 4th OFDM symbol, the PBCH is allocated to subcarriers in which the DMRS for the PBCH is not allocated.

The antenna ports of a PSS, an SSS, a PBCH, and a DMRS for the PBCH in an SS/PBCH block may be identical.

A PBCH may be estimated from a DMRS for the PBCH. For the DM-RS for the PBCH, the channel over which a symbol for the PBCH on an antenna port is conveyed can be inferred from the channel over which another symbol for the DM-RS on the antenna port is conveyed only if the two symbols are within a SS/PBCH block transmitted within the same slot, and with the same SS/PBCH block index.

DL DMRS is a generic name of DMRS for a PBCH, DMRS for a PDSCH, and DMRS for a PDCCH.

A set of antenna ports for a DMRS for a PDSCH (a DMRS associated with a PDSCH, a DMRS included in a PDSCH, a DMRS which corresponds to a PDSCH) may be given based on the set of antenna ports for the PDSCH. The set of antenna ports for the DMRS for the PDSCH may be the same as the set of antenna ports for the PDSCH.

Transmission of a PDSCH and transmission of a DMRS for the PDSCH may be indicated (or scheduled) by one DCI format. The PDSCH and the DMRS for the PDSCH may be collectively referred to as PDSCH. Transmitting a PDSCH may be transmitting a PDSCH and a DMRS for the PDSCH.

A PDSCH may be estimated from a DMRS for the PDSCH. For a DM-RS associated with a PDSCH, the channel over which a symbol for the PDSCH on one antenna port is conveyed can be inferred from the channel over which another symbol for the DM-RS on the antenna port is conveyed only if the two symbols are within the same resource as the scheduled PDSCH, in the same slot, and in the same PRG (Precoding Resource Group).

Antenna ports for a DMRS for a PDCCH (a DMRS associated with a PDCCH, a DMRS included in a PDCCH, a DMRS which corresponds to a PDCCH) may be the same as an antenna port for the PDCCH.

A PDCCH may be estimated from a DMRS for the PDCCH. For a DM-RS associated with a PDCCH, the channel over which a symbol for the PDCCH on one antenna port is conveyed can be inferred from the channel over which another symbol for the DM-RS on the same antenna port is conveyed only if the two symbols are within resources for which the UE may assume the same precoding being used (i.e. within resources in a REG bundle).

A BCH (Broadcast CHannel), a UL-SCH (Uplink-Shared CHannel) and a DL-SCH (Downlink-Shared CHannel) are transport channels. A channel used in the MAC layer is called a transport channel. A unit of transport channel used in the MAC layer is also called transport block (TB) or MAC PDU (Protocol Data Unit). In the MAC layer, control of HARQ (Hybrid Automatic Repeat request) is performed for each transport block. The transport block is a unit of data delivered by the MAC layer to the physical layer. In the physical layer, transport blocks are mapped to codewords and modulation processing is performed for each codeword.

One UL-SCH and one DL-SCH may be provided for each serving cell. BCH may be given to PCell. BCH may not be given to PSCell and SCell.

A BCCH (Broadcast Control CHannel), a CCCH (Common Control CHannel), and a DCCH (Dedicated Control CHannel) are logical channels. The BCCH is a channel of the RRC layer used to deliver MIB or system information. The CCCH may be used to transmit a common RRC message in a plurality of terminal devices 1. The CCCH may be used for the terminal device 1 which is not connected by RRC. The DCCH may be used at least to transmit a dedicated RRC message to the terminal device 1. The DCCH may be used for the terminal device 1 that is in RRC-connected mode.

The RRC message includes one or more RRC parameters (information elements). For example, the RRC message may include a MIB. For example, the RRC message may include system information (SIB: System Information Block, MIB). SIB is a generic name for various type of SIBs (e.g., SIB1, SIB2). For example, the RRC message may include a message which corresponds to a CCCH. For example, the RRC message may include a message which corresponds to a DCCH. RRC message is a general term for common RRC message and dedicated RRC message.

SIB1 contains information relevant when evaluating if a UE is allowed to access a cell and defines the scheduling of other system information. It also contains radio resource configuration information that is common for all UEs and barring information applied to the unified access control. The terminal device 1 may be indicated with SIB1 via a PDSCH scheduled by a PDCCH. Configuration information including CORESET configuration and search space set configuration for monitoring the PDCCH may be indicated by MIB.

The BCCH in the logical channel may be mapped to the BCH or the DL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to a PUSCH in the physical channel. The DL-SCH in the transport channel may be mapped to a PDSCH in the physical channel. The BCH in the transport channel may be mapped to a PBCH in the physical channel.

A higher-layer parameter is a parameter included in an RRC message or a MAC CE (Medium Access Control Control Element). The higher-layer parameter is a generic name of information included in a MIB, system information, a message which corresponds to CCCH, a message which corresponds to DCCH, and a MAC CE.

The procedure performed by the terminal device 1 includes at least a part of or all the following 5A to 5C. The 5A is cell search. The 5B is random-access. The 5C is data communication.

The cell search is a procedure used by the terminal device 1 to synchronize with a cell in the time domain and/or the frequency domain and to detect a physical cell identity. The terminal device 1 may detect the physical cell ID by performing synchronization of time domain and/or frequency domain with a cell by the cell search.

A sequence of a PSS is given based at least on a physical cell ID. A sequence of an SSS is given based at least on the physical cell ID. The terminal device 1 receives the PSS and the SSS in order to perform cell search.

An SS/PBCH block candidate indicates a resource on which an SS/PBCH block may be transmitted. That is, the SS/PBCH block may be transmitted on the resource indicated by the SS/PBCH block candidate. The base station device 3 may transmit an SS/PBCH block at an SS/PBCH block candidate. The terminal device 1 may receive (detect) the SS/PBCH block at the SS/PBCH block candidate. Terminologies of "SS/PBCH block candidate" and "candidate SS/PBCH block" can be interchangeably used.

A set of SS/PBCH block candidates in a half radio frame is also referred to as an SS-burst-set. The SS-burst-set is also referred to as a transmission window, a SS transmission window, or a DRS transmission window (Discovery Reference Signal transmission window). The SS-burst-set is a generic name that includes at least a first SS-burst-set and a second SS-burst-set.

The base station device 3 transmits SS/PBCH blocks corresponding to one or more indexes at a predetermined cycle. The terminal device 1 may detect an SS/PBCH block of at least one of the SS/PBCH blocks corresponding to the one or more indexes. The terminal device 1 may attempt to decode the PBCH included in the SS/PBCH block.

A PRACH may be used to transmit a random-access preamble. The PRACH may be used to convey a random-access preamble. The sequence $x_{u,v}(n)$ of the PRACH is defined by $x_{u,v}(n)=x_u(\mathrm{mod}(n+C_v, L_{RA}))$. The $x_u$ may be a ZC sequence (Zadoff-Chu sequence). The $x_u$ may be defined by $x_u=\exp(-jpui(i+1)/L_{RA})$. The j is an imaginary unit. The p is the circle ratio. The $C_v$ corresponds to cyclic shift of the PRACH. $L_{RA}$ corresponds to the length of the PRACH. The $L_{RA}$ may be 839 or 139 or 571 or 1151 or another value. The i is an integer in the range of 0 to $L_{RA}-1$. The u is a sequence index for the PRACH. The terminal device 1 may transmit the PRACH. The base station device 3 may receive the PRACH.

For a given PRACH occasion (PRACH opportunity), 64 random-access preambles are defined. The random-access preamble is specified (determined, given) at least based on the cyclic shift $C_v$ of the PRACH and the sequence index u for the PRACH.

An uplink physical signal may correspond to a set of resource elements. The uplink physical signal may not carry information generated in the higher-layer. The uplink physical signal may be a physical signal used in the uplink component carrier. The terminal device 1 may transmit an uplink physical signal. The base station device 3 may receive the uplink physical signal. In the radio communication system according to one aspect of the present embodiment, at least a part of or all UL DMRS (UpLink Demodulation Reference Signal), SRS (Sounding Reference Signal), UL PTRS (UpLink Phase Tracking Reference Signal) may be used.

A random-access is a procedure including at least a part of or all message 1, message 2, message 3, and message 4.

The message 1 is a procedure in which the terminal device 1 transmits a PRACH. The terminal device 1 transmits the PRACH in one PRACH occasion selected among one or more PRACH occasions based on at least the index of the SS/PBCH block candidate detected based on the cell search.

PRACH occasion configuration (random access configuration) may include at least part or all of a PRACH configuration period (PCF) $T_{PCF}$, a number of PRACH occasions $N^{PCF}_{RO,t}$ included in the time domain of a PRACH configuration period, a number of PRACH occasions included in the frequency domain $N_{RO,f}$, a number $N^{RO}_{preamble}$ of random-access preambles per PRACH occasion allocated for random-access, a number of preambles allocated per index of SS/PBCH block candidate for contention based random-access (CBRA), $N^{SSB}_{preamble,CBRA}$, and a number of PRACH occasions $N^{SSB}_{RO}$ allocated per index of SS/PBCH block candidate for contention based random-access.

At least based on the PRACH occasion configuration, at least part or all of time domain resources and frequency domain resources are provided for a PRACH occasion.

Terminologies "SS/PBCH block candidate" and "SS/PBCH block" may be used interchangeably.

An association between an index of an SS/PBCH block candidate that corresponds to an SS/PBCH block detected by the terminal device 1 and a PRACH occasion may be provided at least based on first bitmap information (ssb-PositionInBurst) indicating one or more indexes of SS/PBCH block candidates used for transmission of actually-transmitted SS/PBCH blocks. The terminal device 1 may determine an association between the index of SS/PBCH block candidate including an SS/PBCH block detected by the terminal device 1 and PRACH occasions. For example, the first element of the first bitmap information may correspond to an SS/PBCH block candidate with index 0. For example, the second element of the first bitmap information may correspond to an SS/PBCH block candidate with index 1. For example, the $L_{SSB}-1^{th}$ element of the first bitmap information may correspond to an SS/PBCH block candidate with index $L_{SSB}-1$. The $L_{SSB}$ is number of SS/PBCH block candidates included in an SS-burst-set.

For example, the first bitmap information (ssb-PositionInBurst) indicating the indexes of SS/PBCH block candidates used for transmission of SS/PBCH blocks is {1, 1, 0, 1, 0, 1, 1, 1}. The indexes of the SS/PBCH block candidates used for transmission of the SS/PBCH blocks is also called as actually transmitted SS/PBCH block or actually-transmitted SS/PBCH block candidate.

Figure 8:
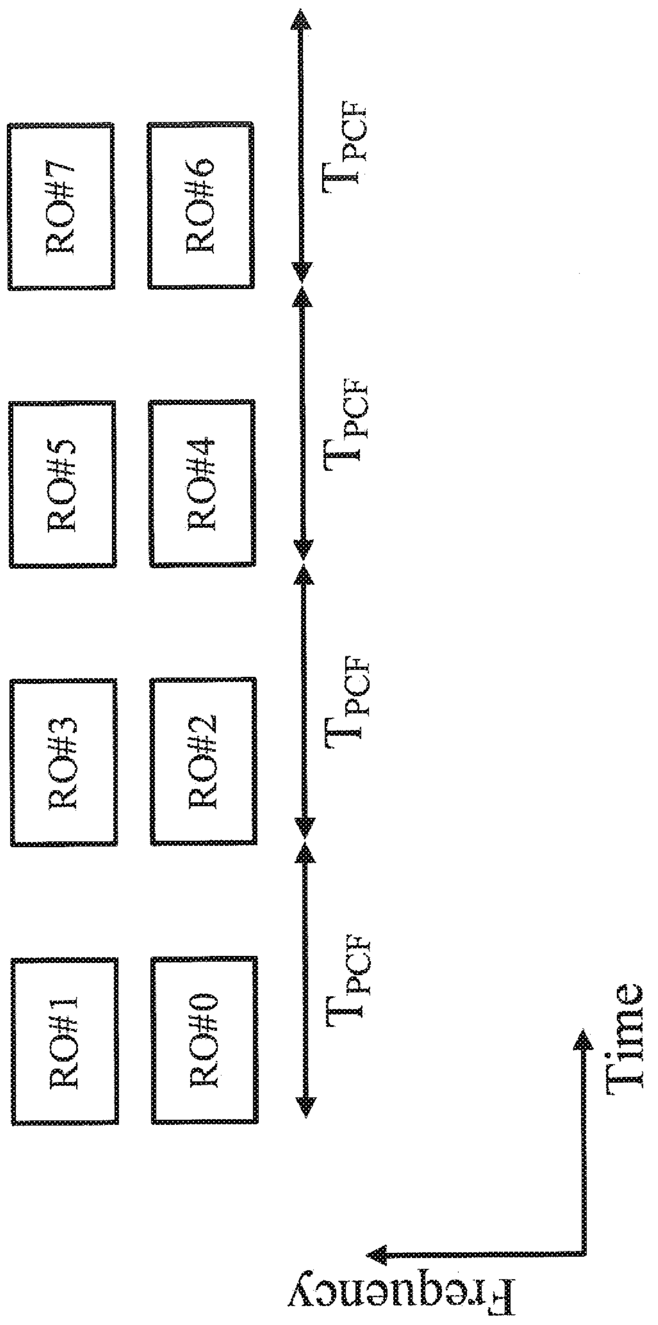
FIG. 8 is a diagram illustrating an example of setting of a PRACH resource according to an aspect of the present embodiment.

FIG. 8 is a diagram illustrating an example of setting of a PRACH resource according to an aspect of the present embodiment. In FIG. 8, the PRACH configuration period $T_{PCF}$ is 10 ms, the number of PRACH occasions included in the time domain of a PRACH configuration period $N^{PCF}_{RO,t}$ is 1, and the number of PRACH occasions included in the frequency domain $N_{RO,f}$ is 2. $N_{RO,f}$ may be provided by the higher-layer parameter msg1-FDM or msgA-RO-FDM. $N^{PCF}_{RO,t}$ may be determined at least based on the configured PRACH configuration index. $T_{PCF}$ may be provided by x in the expression "$n_{SFN}$ mod x=y" in the row corresponding to the configured PRACH configuration index.

Figure 9:
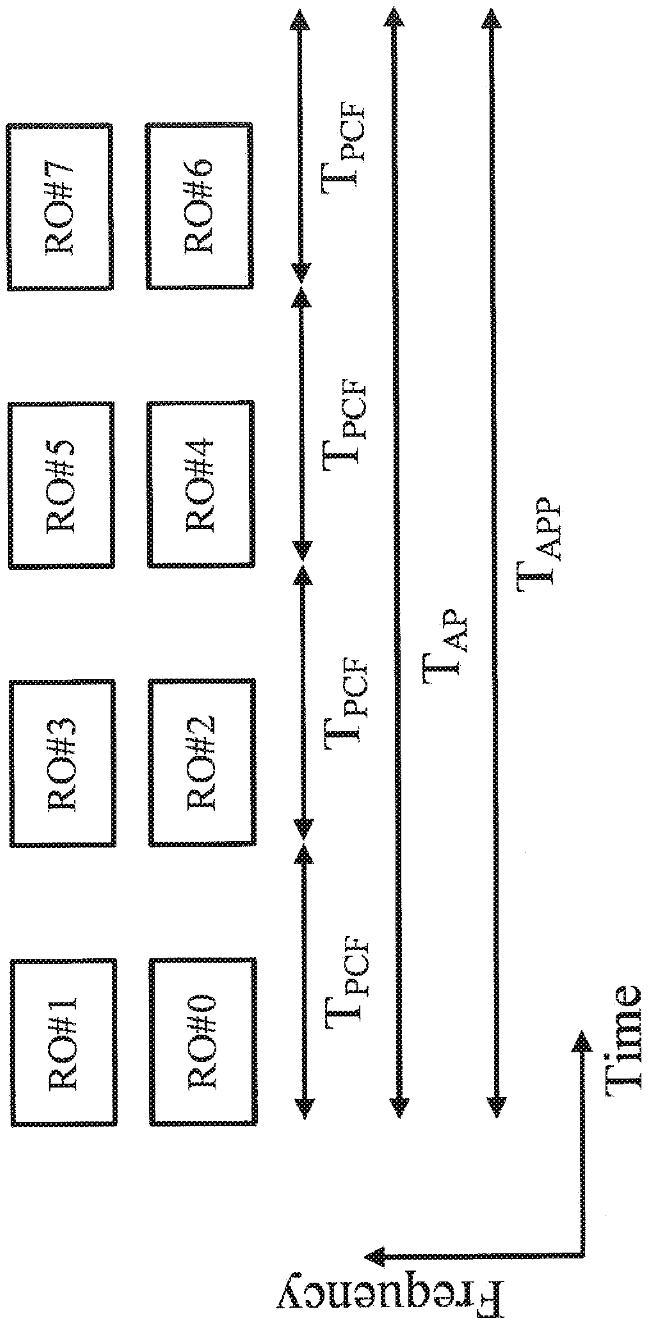
FIG. 9 is an example of an association between indexes of SS/PBCH block candidates and PRACH occasions (SS-RO association) according to an aspect of the embodiment.

FIG. 9 is an example of an association between indexes of SS/PBCH block candidates and PRACH occasions (SS-RO association) according to an aspect of the embodiment. In FIG. 9, it is assumed that PRACH occasion configuration is the same as in FIG. 8. A case where $N^{RO}_{preamble}=64$, $N^{SSB}_{preamble,CBRA}=64$, $N^{SSB}_{RO}=1$, and the first bitmap is set to {1,1,0,1,0,1,1,1} is assumed. In FIG. 9, the SS/PBCH block candidate with index 0 may correspond to the PRACH occasion (RO #0) with index 0, the SS/PBCH block candidate with index 1 may correspond to the PRACH occasion (RO #1) with index 1, and the SS/PBCH block candidate with index 3 may correspond to the PRACH occasion (RO #2) with index 2, the SS/PBCH block candidate with index 5 may correspond to the PRACH occasion (RO #3) with index 3, the SS/PBCH block candidate with index 6 may correspond to the PRACH opportunity of index 4 (RO #4), the SS/PBCH block candidate with index 7 may correspond to the PRACH opportunity of index 5 (RO #5). In FIG. 9, a PRACH association period (PRACH AP) $T_{AP}$ is 40 ms (that is, $N_{PCF}T_{PCF}$ PRACH configuration periods, where $N_{PCF}=4$). $N_{PCF}$ may be chosen from 1, 2, 4, 8, and 16. Within the PRACH association period (PRACH AP) $T_{AP}$, the PRACH opportunity of index 6 (RO #6) and the PRACH opportunity of index 7 (RO #7) may not be associated to any SS/PBCH block candidate. In FIG. 9, PRACH association pattern period (PRACH APP) $T_{APP}$ is 40 ms. In FIG. 9, the PRACH association pattern period includes one PRACH association period.

Figure 10:
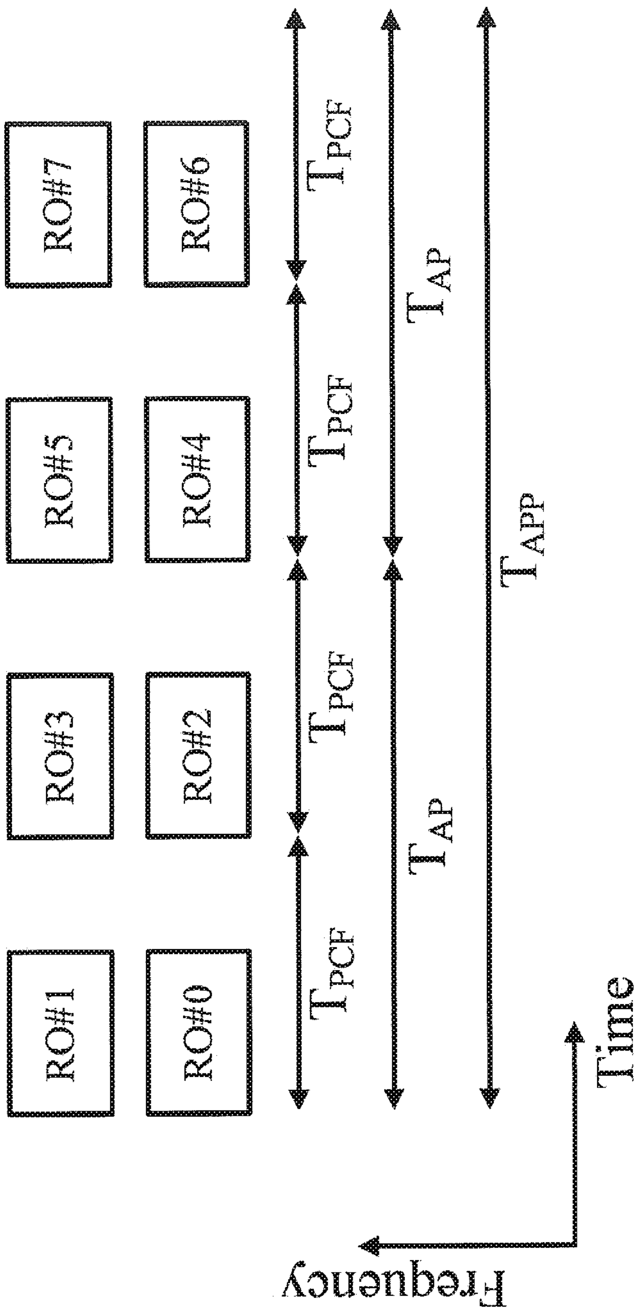
FIG. 10 is an example of an association between indexes of SS/PBCH block candidates and PRACH occasions (SS-RO association) according to an aspect of the embodiment.

FIG. 10 is an example of an association between indexes of SS/PBCH block candidates and PRACH occasions (SS-RO association) according to an aspect of the embodiment. A case where $N^{RO}_{preamble}=64$, $N^{SSB}_{preamble,CBRA}=64$, $N^{SSB}_{RO}=1$, and the first bitmap is set to {1,1,0,1,0,1,0,0} is assumed. In FIG. 10, it is assumed that PRACH occasion configuration is the same as in FIG. 8. In FIG. 10, the SS/PBCH block candidate with index 0 may correspond to the PRACH occasion (RO #0) with index 0 and the PRACH occasion (RO #4) with index 4, the SS/PBCH block candidate with index 1 may correspond to the PRACH occasion (RO #1) with index 1 and the PRACH occasion (RO #5) with index 5, the SS/PBCH block candidate with index 3 may correspond to the PRACH occasion (RO #2) with index 2 and the PRACH occasion (RO #6) with index 6, the SS/PBCH block candidate with index 5 may correspond to the PRACH occasion (RO #3) with index 3 and the PRACH occasion (RO #7) with index 7. In FIG. 10, a first PRACH association period (PRACH AP) $T_{AP}$ is 20 ms including PRACH occasions from index 0 to index 3 and a second PRACH association period (PRACH AP) $T_{AP}$ is 20 ms including PRACH occasions from index 4 to index 7. In FIG. 10, PRACH association pattern period (PRACH APP) $T_{APP}$ is 40 ms. In FIG. 10, the PRACH association pattern period includes two PRACH association periods.

The smallest index of "the SS/PBCH block candidates actually used for transmission of SS/PBCH blocks" indicated by the first bitmap information may correspond to the first PRACH occasion (the PRACH occasion with index 0). The n-th index of "the SS/PBCH block candidates actually used for transmission of SS/PBCH blocks" indicated by the first bitmap information may correspond to the n-th PRACH occasion (the PRACH occasion with index n−1).

The index of the PRACH occasion is set to the PRACH occasions included in the PRACH association pattern period with priority given to the frequency axis (frequency-first time-second). That is, the PRACH occasion mapping may be performed in frequency domain first and then in time domain.

In FIG. 9, PRACH occasions which corresponds to at least one actually-transmitted SS/PBCH block candidates are the PRACH occasion with index 0 to 4, and the PRACH configuration periods including at least one PRACH occasion which corresponds to at least one actually-transmitted SS/PBCH block candidates are first to third PRACH configuration periods. In FIG. 10, PRACH occasions which corresponds to at least one actually-transmitted SS/PBCH block candidates are the PRACH occasion with index 0 to 3, and the PRACH configuration periods including at least one PRACH occasion which corresponds to at least one actually-transmitted SS/PBCH block candidates are first to second PRACH configuration periods.

When the maximum integer k satisfying $T_{APP}>k*T_{AP}$ is 2 or more, one PRACH association pattern period is configured to include k PRACH association periods. In FIG. 10, since the largest integer k satisfying $T_{APP}>k*T_{AP}$ is 2, the first PRACH association period includes the two PRACH configuration periods from the beginning, and the second PRACH association period includes the third to fourth PRACH configuration periods.

An association period, starting from frame 0, for mapping SS/PBCH block indexes to PRACH occasions is the smallest value in the set determined by the PRACH configuration period such that $N_{Tx}^{SSB}$ SS/PBCH block indexes are mapped at least once to the PRACH occasions within the association period, where a UE obtains $N_{Tx}^{SSB}$ from the value of ssb-PositionsInBurst. Here, the set may be {1, 2, 4, 8, 16} if the PRACH configuration period is 10 ms. The set may be {1, 2, 4, 8} if the PRACH configuration period is 20 ms. The set may be {1, 2, 4} if the PRACH configuration period is 40 ms. The set may be {1, 2} if the PRACH configuration period is 80 ms. The set may be {1} if the PRACH configuration period is 160 ms. If after an integer number of SS/PBCH block indexes to PRACH occasions mapping cycles within the association period there is a set of PRACH occasions or PRACH preambles that are not mapped to $N_{Tx}^{SSB}$ SSB SS/PBCH block indexes, no SS/PBCH block indexes are mapped to the set of PRACH occasions or PRACH preambles. An association pattern period includes one or more association periods and is determined so that a pattern between PRACH occasions and SS/PBCH block indexes repeats at most every 160 ms. PRACH occasions not associated with SS/PBCH block indexes after an integer number of association periods, if any, are not used for PRACH transmissions.

For a PRACH transmission triggered upon request by higher layers, a value of ra-OccassionList, if csirs-ResourceList is provided, indicates a list of PRACH occasions for the PRACH transmission where the PRACH occasions are associated with the selected CSI-RS index indicated by csi-RS. The indexing of the PRACH occasions indicated by ra-OccasionList is reset per association pattern period.

The terminal device 1 may transmit a PRACH with a random-access preamble in a PRACH occasion selected from PRACH occasions which corresponds to the index of the detected SS/PBCH block candidate. The base station device 3 may receive the PRACH in the selected PRACH occasion.

The message 2 is a procedure in which the terminal device 1 attempts to detect a DCI format 1_0 with CRC (Cyclic Redundancy Check) scrambled by an RA-RNTI (Random Access-Radio Network Temporary Identifier). The terminal device 1 may attempt to detect the DCI format 1_0 in a search-space-set.

The message 3 is a procedure for transmitting a PUSCH scheduled by a random-access response grant included in the DCI format 1_0 detected in the message 2 procedure. The random-access response grant is indicated by the MAC CE included in the PDSCH scheduled by the DCI format 1_0.

The PUSCH scheduled based on the random-access response grant is either a message 3 PUSCH or a PUSCH. The message 3 PUSCH contains a contention resolution identifier MAC CE. The contention resolution 1D MAC CE includes a contention resolution 1D.

Retransmission of the message 3 PUSCH is scheduled by DCI format 0_0 with CRC scrambled by a TC-RNTI (Temporary Cell-Radio Network Temporary Identifier).

The message 4 is a procedure that attempts to detect a DCI format 1_0 with CRC scrambled by either a C-RNTI (Cell-Radio Network Temporary Identifier) or a TC-RNTI. The terminal device 1 receives a PDSCH scheduled based on the DCI format 1_0. The PDSCH may include a collision resolution 1D.

Data communication is a generic term for downlink communication and uplink communication.

In data communication, the terminal device 1 attempts to detect a PDCCH (attempts to monitor a PDCCH, monitors a PDCCH). in a resource identified at least based on one or all of a control resource set and a search-space-set. It's also called as "the terminal device 1 attempts to detect a PDCCH in a control resource set", "the terminal device 1 attempts to detect a PDCCH in a search-space-set", "the terminal device 1 attempts to detect a PDCCH candidate in a control resource set", "the terminal device 1 attempts to detect a PDCCH candidate in a search-space-set", "the terminal device 1 attempts to detect a DCI format in a control resource set", or "the terminal device 1 attempts to detect a DCI format in a search-space-set". Monitoring a PDCCH may be equivalent as monitoring a DCI format in the PDCCH.

The control resource set is a set of resources configured by a number of resource blocks and a predetermined number of OFDM symbols in a slot.

The set of resources for the control resource set may be indicated by higher-layer parameters. The number of OFDM symbols included in the control resource set may be indicated by higher-layer parameters.

A PDCCH may be also called as a PDCCH candidate.

A search-space-set is defined as a set of PDCCH candidates. A search-space-set may be a Common Search Space (CSS) set or a UE-specific Search Space (USS) set.

The CSS set is a generic name of a type-0 PDCCH common search-space-set, a type-0a PDCCH common search-space-set, a type-1 PDCCH common search-space-set, a type-2 PDCCH common search-space-set, and a Type-3 PDCCH common search-space-set. The USS set may be also called as UE-specific PDCCH search-space-set.

The type-0 PDCCH common search-space-set may be used as a common search-space-set with index 0. The type-0 PDCCH common search-space-set may be an common search-space-set with index 0.

A search-space-set is associated with (included in, corresponding to) a control resource set. The index of the control resource set associated with the search-space-set may be indicated by higher-layer parameters.

For a search-space-set, a part of or all 6A to 6C may be indicated at least by higher-layer parameters. The 6A is PDCCH monitoring period. The 6B is PDCCH monitoring pattern within a slot. The 6C is PDCCH monitoring offset.

A monitoring occasion of a search-space-set may correspond to one or more OFDM symbols in which the first OFDM symbol of the control resource set associated with the search-space-set is allocated. A monitoring occasion of a search-space-set may correspond to resources identified by the first OFDM symbol of the control resource set associated with the search-space-set. A monitoring occasion of a search-space-set is given based at least on a part of or all PDCCH monitoring periodicity, PDCCH monitoring pattern within a slot, and PDCCH monitoring offset.

Figure 11:
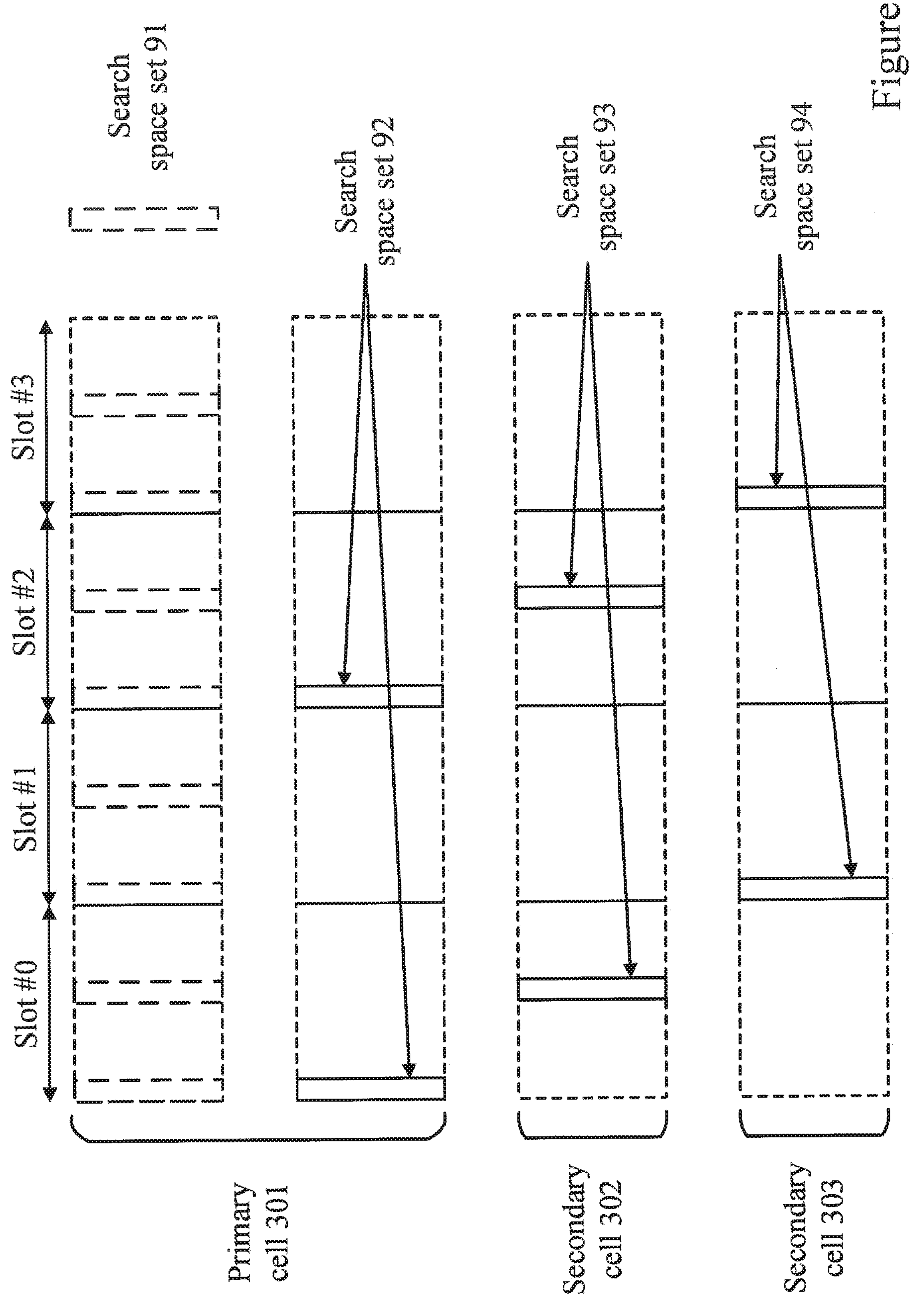
FIG. 11 is a diagram showing an example of the monitoring occasion of the search-space-set according to an aspect of the present embodiment.

FIG. 11 is a diagram showing an example of the monitoring occasion of the search-space-set according to an aspect of the present embodiment. In FIG. 11, the search-space-set 91 and the search-space-set 92 are sets in the primary cell 301, the search-space-set 93 is a set in the secondary cell 302, and the search-space-set 94 is a set in the secondary cell 303.

In FIG. 11, the PDCCH monitoring periodicity for the search-space-set 91 is set to 1 slot, the PDCCH monitoring offset for the search-space-set 91 is set to 0 slot, and the PDCCH monitoring pattern for the search-space-set 91 is [1, 0, 0, 0, 0, 0, 0, 1, 0, 0, 0, 0, 0, 0]. That is, the monitoring occasion of the search-space-set 91 corresponds to the first OFDM symbol (OFDM symbol #0) and the eighth OFDM symbol (OFDM symbol #7) in each of the slots.

In FIG. 11, the PDCCH monitoring periodicity for the search-space-set 92 is set to 2 slots, the PDCCH monitoring offset for the search-space-set 92 is set to 0 slots, and the PDCCH monitoring pattern for the search-space-set 92 is [1, 0, 0, 0, 0, 0, 0, 0, 0, 0, 0, 0, 0, 0]. That is, the monitoring occasion of the search-space-set 92 corresponds to the leading OFDM symbol (OFDM symbol #0) in each of the even slots.

In FIG. 11, the PDCCH monitoring periodicity for the search-space-set 93 is set to 2 slots, the PDCCH monitoring offset for the search-space-set 93 is set to 0 slots, and the PDCCH monitoring pattern for the search-space-set 93 is [0, 0, 0, 0, 0, 0, 0, 1, 0, 0, 0, 0, 0, 0]. That is, the monitoring occasion of the search-space-set 93 corresponds to the eighth OFDM symbol (OFDM symbol #8) in each of the even slots.

In FIG. 11, the PDCCH monitoring periodicity for the search-space-set 94 is set to 2 slots, the PDCCH monitoring offset for the search-space-set 94 is set to 1 slot, and the PDCCH monitoring pattern for the search-space-set 94 is [1, 0, 0, 0, 0, 0, 0, 0, 0, 0, 0, 0, 0, 0]. That is, the monitoring occasion of the search-space-set 94 corresponds to the leading OFDM symbol (OFDM symbol #0) in each of the odd slots.

The type-0 PDCCH common search-space-set may be at least used for a DCI format with a cyclic redundancy check (CRC) sequence scrambled by an SI-RNTI (System Information-Radio Network Temporary Identifier).

The type-0a PDCCH common search-space-set may be used at least for a DCI format with a cyclic redundancy check sequence scrambled by an SI-RNTI.

The type-1 PDCCH common search-space-set may be used at least for a DCI format with a CRC sequence scrambled by an RA-RNTI (Random Access-Radio Network Temporary Identifier) or a CRC sequence scrambled by a TC-RNTI (Temporary Cell-Radio Network Temporary Identifier).

The type-2 PDCCH common search-space-set may be used for a DCI format with a CRC sequence scrambled by P-RNTI (Paging-Radio Network Temporary Identifier).

The Type-3 PDCCH common search-space-set may be used for a DCI format with a CRC sequence scrambled by a C-RNTI (Cell-Radio Network Temporary Identifier).

The UE-specific search-space-set may be used at least for a DCI format with a CRC sequence scrambled by a C-RNTI.

In downlink communication, the terminal device 1 may detect a downlink DCI format. The detected downlink DCI format is at least used for resource assignment for a PDSCH. The detected downlink DCI format is also referred to as downlink assignment. The terminal device 1 attempts to receive the PDSCH. Based on a PUCCH resource indicated based on the detected downlink DCI format, an HARQ-ACK corresponding to the PDSCH (HARQ-ACK corresponding to a transport block included in the PDSCH) may be reported to the base station device 3.

In uplink communication, the terminal device 1 may detect an uplink DCI format. The detected uplink DCI format is at least used for resource assignment for a PUSCH. The detected uplink DCI format is also referred to as uplink grant. The terminal device 1 transmits the PUSCH.

The base station device 3 and the terminal device 1 may perform a channel access procedure in the serving cell c. The base station device 3 and the terminal device 1 may perform transmission of a transmission wave in the serving cell c. For example, the serving cell c may be a serving cell configured in an Unlicensed band. The transmission wave is a physical signal transmitted from the base station device 3 to the medium or a physical signal transmitted from the terminal device 1 to the medium.

The base station device 3 and the terminal device 1 may perform a channel access procedure on the carrier f of the serving cell c. The base station device 3 and the terminal device 1 may perform transmission of a transmission wave on the carrier f of the serving cell c. The carrier f is a carrier included in the serving cell c. The carrier f may be configured by a set of resource blocks given based on higher-layer parameters.

The base station device 3 and the terminal device 1 may perform a channel access procedure on the carrier f of the serving cell c. The base station device 3 and the terminal device 1 may perform transmission of a transmission wave on the BWP b of the carrier f of the serving cell c. The BWP b is a subset of resource blocks included in the carrier f.

The base station device 3 and the terminal device 1 may perform the channel access procedure in the BWP b of the carrier f of the serving cell c. The base station device 3 and the terminal device 1 may perform transmission of a transmission wave in the carrier f of the serving cell c. Carrying out transmission of the transmission wave on the carrier f of the serving cell c may be transmission of the transmission wave on any set of the BWPs included in the carrier f of the serving cell c.

The base station device 3 and the terminal device 1 may perform the channel access procedure in the BWP b of the carrier f of the serving cell c. The base station device 3 and the terminal device 1 may transmit a transmission wave in the BWP b of the carrier f of the serving cell c.

The channel access procedure may include at least one or both of a first sensing and a counting procedure. The first channel access procedure may include a first measurement. The first channel access procedure may not include the counting procedure. The second channel access procedure may at least include both the first measurement and the counting procedure. The channel access procedure is a designation including a part of or all the first channel access procedure and the second channel access procedure.

After the first channel access procedure is performed, a transmission wave including at least an SS/PBCH block may be transmitted. After the first channel access procedure is performed, the gNB may transmit at least a part of or all an SS/PBCH block, a PDSCH including broadcast information, PDCCH including DCI format used for scheduling of the PDSCH, and a CSI-RS. After the second channel access procedure is performed, a transmission wave including at least a PDSCH including information which is other than the broadcast information may be transmitted. The PDSCH including the broadcast information may include at least a part of or all a PDSCH including system information, a PDSCH including paging information, and a PDSCH used for random-access (e.g., message 2 and/or message 4).

A transmission wave including at least a part of or all an SS/PBCH block, a PDSCH including broadcast information, a PDCCH including a DCI format used for scheduling the PDSCH, and a CSI-RS is also referred to as DRS (Discovery Reference Signal). The DRS may be a set of physical signals transmitted after the first channel access procedure.

If the period of the DRS is less than or equal to a predetermined length and the duty cycle of the DRS is less than or equal to a predetermined value, a transmission wave including the DRS may be transmitted after the first channel access procedure is performed. When the duration of the DRS exceeds the predetermined length, a transmission wave including the DRS may be transmitted after the second channel access procedure is performed. When the duty cycle of the DRS exceeds the predetermined value, a transmission wave including the DRS may be transmitted after the second channel access procedure is performed. For example, the predetermined length may be 1 ms. For example, the predetermined value may be 1/20.

RNTI (Radio Network Temporary Identifier) types may at least include SI-RNTI, P-RNTI, RA-RNTI, and C-RNTI. The RA-RNTI is used for random access response. An RNTI value of 0 (0000 in hexa-decimal) may be not available (N/A) for use. An RNTI value of 65534 (FFFE in hexa-decimal) may be pre-allocated as P-RNTI. An RNTI value of 65535 (FFFF in hexa-decimal) may be pre-allocated as SI-RNTI. RNTI values from 65522 to 65533 (from FFF2 to FFFD in hexa-decimal) may be reserved.

SCS (SubCarrier-Spacing) of 15 kHz, 30 kHz, 60 kHz, or 120 kHz may be used for PRACH transmission. That is, numerology of 0, 1, 2, or 3 (u=0, 1, 2, or 3) may be used for PRACH transmission. SCS of 240 kHz, 480 kHz, or 960 kHz may be used for PRACH transmission. That is, numerology of 4, 5, or 6 (u=4, 5, or 6) may be used for PRACH transmission. SCS higher than 960 kHz (numerology larger than 6) may be used for PRACH transmission.

The terminal device 1 may transmit a PRACH. The base station device 3 may detect the PRACH. In response to the PRACH detection, the base station device 3 may transmit a DCI format with CRC scrambled by a RA-RNTI during a RAR window. In response to the PRACH transmission, the terminal device 1 may attempt to detect (receive) the DCI format during the RAR window. The DCI format may be a DCI format 1_0. The RAR window may start at the first symbol of the earliest CORESET the terminal device 1 is configured to receive PDCCH for Type1-PDCCH CSS set that is at least one symbol after the last symbol of the PRACH occasion corresponding to the PRACH transmission. The length of the RAR window in number of slots, based on the SCS for Type1-PDCCH CSS set, may be provided by a higher-layer parameter, for example, ra-ResponseWindow.

The RA-RNTI may be given by (provided by, calculated as, computed as) 1+s_id+14 xt_id+14×80×f_id+14×80×8×ul_carrier_id. The s_id may be an index of the first OFDM symbol of the PRACH. The t_id may be an index of the first slot of the PRACH in a system frame. The f_id may be an index of the PRACH in the frequency domain. The ul_carrier_id may be a uplink carrier used for the PRACH. Calculation (computation) of the RA-RNTI may be performed by the base station device 3 and/or the terminal device 1. A unique time-frequency domain location of the PRACH during a window (for example, a RAR window) may be determined at least based on a unique RA-RNTI value. The base station device 3 may indicate the detected PRACH via the RA-RNTI. The terminal device 1 may determine the unique time-frequency domain location of the PRACH at least based on the detected RA-RNTI.

In a case that the terminal device 1 detects the DCI format with CRC scrambled by the corresponding RA-RNTI and LSBs of a SFN field in the DCI format are the same as corresponding LSBs of the SFN where the terminal device 1 transmitted the PRACH, and the terminal device 1 receives a transport block in a corresponding PDSCH within the window, the terminal device 1 may pass the transport block to higher layers. The higher layers may parse the transport block for a random access preamble identity (RAPID) associated with the PRACH transmission. In a case that the higher layers identify the RAPID in RAR message(s) of the transport block, the higher layers may indicate an uplink grant to the physical layer. The terminal device 1 may consider (assume, determine) that the RAR or the RAR message(s) or the PDSCH or the transport block or the RA-RNTI is valid.

The RA-RNTI (a first RA-RNTI) may be given by (provided by, calculated as, computed as) mod ((1+s_id+14×t_id+14×max (80, N_max)×f_id+14×max (80, N_max)×8×ul_carrier_id), 65536). In a case that the RA-RNTI is not available (for example, an RA-RNTI value of 0), or reserved, or pre-allocated as P-RNTI or SI-RNTI (the computed RA-RNTI value is an RNTI value that is not available, or reserved, or pre-allocated for P-RNTI or SI-RNTI), the PRACH may be dropped. That is, the terminal device 1 may not transmit the PRACH. The base station device 3 may not expect to receive the PRACH. Alternatively, the first RA-RNTI may be skipped. The terminal device 1 may transmit the PRACH and may expect to detect a second RA-RNTI corresponding to the PRACH. The base station device 3 may select the second RA-RNTI in correspondence to the PRACH. The second RA-RNTI may be different from the first RA-RNTI. The second RA-RNTI may be depend on the first RA-RNTI. The second RA-RNTI may be one of the reserved RA-RNTI values. The N_max may be a number of slots in a maximum SCS within a system frame. For example, when the maximum SCS is 120 kHz, N_max is 80. For example, when the maximum SCS is 240 kHz, N_max is 160. For example, when the maximum SCS is 480 kHz, N_max is 320. For example, when the maximum SCS is 960 kHz, N_max is 640. In a case that the terminal device 1 detect the RA-RNTI is not available (for example, 0), or reserved, or pre-allocated for P-RNTI or SI-RNTI, the terminal device 1 may consider (assume, determine) that the RAR or the RAR message(s) or the PDSCH or the transport block or the RA-RNTI is invalid. By avoiding using an RNTI value that is not available, or reserved, or pre-allocated for P-RNTI or SI-RNTI for RA-RNTI, the RA-RNTI is confined to a normal range that would not cause potential problems (for example, a problem of CRC scrambling, or a problem of occupying the reserved or pre-allocated value).

The RA-RNTI may be given by (provided by, calculated as, computed as) 1+s_id+14×t_id+14×N_base×f_id+14×N_base×8×ul_carrier_id. The N_base may be 80 or 160. The base station device 3 may indicate the detected PRACH via the RA-RNTI together with one bit or multiple bits. The one bit or multiple bits are indicated by the DCI format, or by a MAC PDU or sub-header included in a PDSCH scheduled by the DCI format, or a CCE index of a PDCCH that includes the DCI format. The terminal device 1 may determine the time-frequency domain location of the PRACH at least based on the detected RA-RNTI together with the one bit or multiple bits. That is, the terminal device 1 may determine whether the PRACH detected by and indicated from the base station device 3 is a PRACH transmitted by the terminal device 1. The number of the bit(s) may be given by ceil (N_max/N_base). For example, in a case that N_base is 160 and N_max is 640, the number of the bits is 4. For example, in a case that N_base is 160 and N_max is 320, the number of the bits is 2. For example, in a case that N_base is 80 and N_max is 80, the number of the bit is 1. In a case that the one bit or the multiple bits indicate an expected value, the terminal device 1 may consider (assume, determine) that the RAR or the RAR message(s) or the PDSCH or the transport block or the RA-RNTI is valid. That is, the terminal device 1 may pass the transport block included in the PDSCH to higher layers. By using the one bit or the multiple bits in addition to the RA-RNTI, for higher SCS of PRACH, the time-frequency domain location of the PRACH can also be uniquely specified within a system frame. Because there might be no need to perform contention resolution, efficiency of random access procedure can be improved.

The RA-RNTI may be computed at least based on logical index of symbol and/or logical index of slot where the PRACH is transmitted. The RA-RNTI may be computed as 1+s_id+L_s×t_id+L_s×L_t×f_id+L_s×L_t×8×ul_carrier_id. The s_id may be defined as a logical index of the first OFDM symbol of the PRACH. The L_s may be a number of logical indexes of OFDM symbols. The t_id may be defined as a logical index of the first slot of the PRACH in a system frame. The L_t may be a number of logical indexes of slots. The s_id may be defined as an index of the first OFDM symbol of the PRACH. The L_s may be $N^{slot}_{symb}$. The L_s may be the number of OFDM symbols within a slot based on the SCS that is assumed by the RA-RNTI calculation. The t_id may be defined as an index of the first slot of the PRACH in a system frame. The L_t may be a predetermined value. The f_id may be an index of the PRACH in the frequency domain. The ul_carrier_id may be an uplink carrier used for the PRACH transmission. The logical index may be defined as a relative index in a total number of allocated PRACH occasions (ROs) within a certain period. For example, 3 ROs are allocated to a first slot and 3 different ROs are allocated to a second slot within a system frame. The logical indexes of slot are 0 and 1. The logical indexes of OFDM symbol are 0, 1, 2, 3, 4, and 5, within the system frame. Alternatively, the logical indexes of OFDM symbol for each 3 ROs are 0, 1, and 2, within each slot. The logical index may be defined for a PRACH configuration index, or for a preamble format, or a set of PRACH configuration indexes. By introducing the logical index of symbol and/or slot when compute the RA-RNTI, for higher SCS of PRACH, the time-frequency domain location of the PRACH can also be uniquely specified within a system frame. Because there might be no need to perform contention resolution, efficiency of random access procedure can be improved.

The length of a PRACH slot is determined based on the SCS of the PRACH. For example, when the SCS of the PRACH is configured to 120 kHz (numerology u=4), there are $10\times2^{(u-1)}=80$ PRACH slots within a system frame and the length of each PRACH slot is 10/80 ms (0.25 ms). For example, when the SCS of the PRACH is configured as 480 kHz (numerology u=6), there are $10\times2^{(u-1)}=320$ PRACH slots within a system frame and the length of each PRACH slot is 10/320 ms (0.03125 ms). The length of an RO allocation slot may be determined at least based on a predefined SCS. The RO allocation slot may be used for determining time-domain resource allocation of PRACH occasion. For example, the predefined SCS may be 15 kHz or 60 kHz or 120 kHz or 240 kHz or 480 kHz or 960 kHz or higher. The number of PRACH slots within an RO allocation slot may be a positive integer, for example, 1, 2, 4, 8, or 16. For example, when the SCS of the PRACH is configured as 480 kHz and the predefined SCS is 60 kHz, there are 8 PRACH slots within an RO allocation slot. The length of an RA-RNTI calculation slot may be determined based on a predetermined number of slots (predetermined SCS) that is used for RA-RNTI calculation. For example, when the predetermined number of slots is 80 (predetermined SCS is 120 kHz), the length of the RA-RNTI baseline slot is 10/80 ms (0.25 ms). The length of a PRACH slot may be the same as or different from the length of a RA-RNTI calculation slot. The length of an RO allocation slot may be the same as or different from the length of a RA-RNTI calculation slot.

Figure 12:
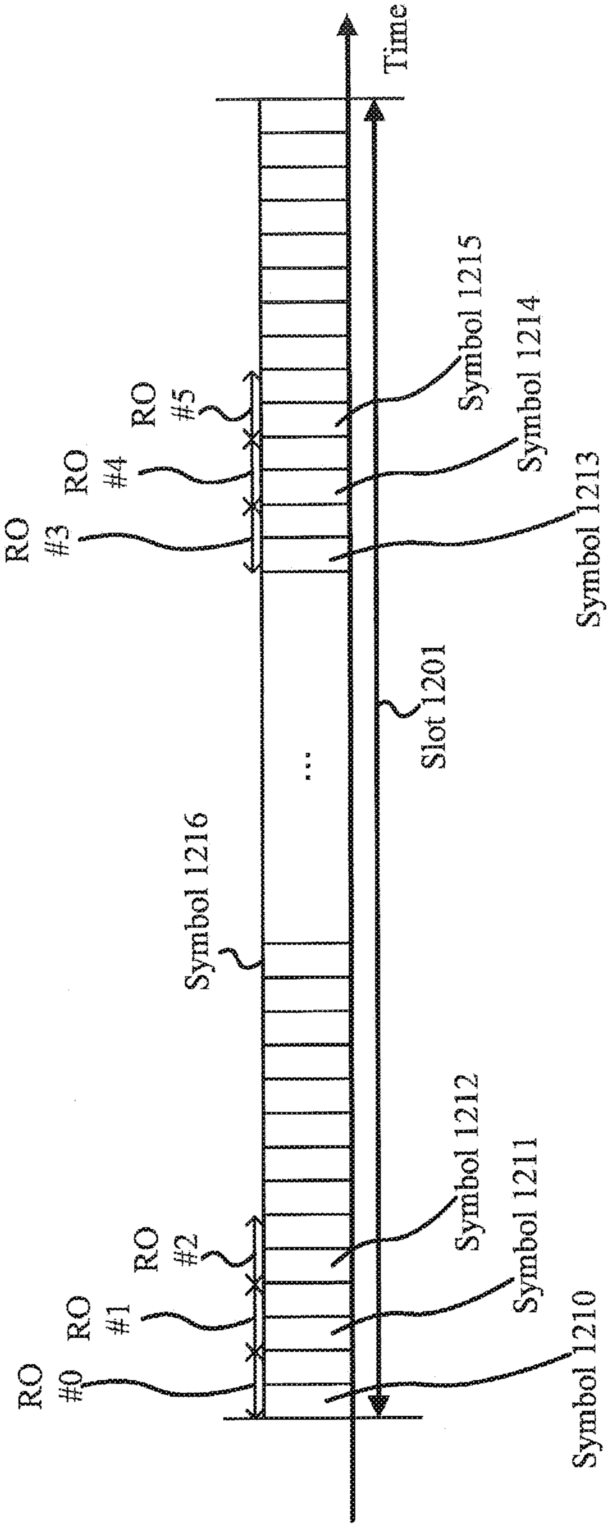
FIG. 12 is a diagram illustrating an example of the logical index of an OFDM symbol according to an aspect of the present embodiment.

FIG. 12 is a diagram illustrating an example of the logical index of an OFDM symbol according to an aspect of the present embodiment. Slot 1201 may be a PRACH slot, an RO allocation slot, or an RA-RNTI calculation slot. The length of an OFDM symbol may be determined by the SCS used for PRACH transmission. For example, the length of symbol 1210, . . . , symbol 1216 is determined by the SCS used for PRACH transmission. There are $N^{slot}_{symb}$ (for example, 14) symbols within a PRACH slot. By applying a PRACH configuration index to a table of random access configurations, time-domain allocation of PRACH occasions may be determined. In FIG. 12, two OFDM symbols starting from symbol 1210 are allocated for PRACH occasion RO #0, two OFDM symbols starting from symbol 1211 are allocated for PRACH occasion RO #1, two OFDM symbols starting from symbol 1212 are allocated for PRACH occasion RO #2, two OFDM symbols starting from symbol 1213 are allocated for PRACH occasion RO #3, two OFDM symbols starting from symbol 1214 are allocated for PRACH occasion RO #4, and two OFDM symbols starting from symbol 1215 are allocated for PRACH occasion RO #5. The logical index of a starting symbol that are allocated a PRACH occasion may be associated to (given by) the index of PRACH occasion. For example, the logical index of symbol 1210 may be 0. For example, the logical index of symbol 1213 may be 3. Within slot 1201, the number of logical indexes of the starting symbols may be determined (given) by the number of allocated PRACH occasions in slot 1201. An OFDM symbol that is not allocated to a PRACH occasion may not be associated to a logical index. For example, symbol 1206 is not associated to a logical index. The number of the logical indexes may be smaller than the number of OFDM symbols in a slot (for example, a PRACH slot). The logical indexes of the OFDM symbols may be used for the calculation of RA-RNTI. The RA-RNTI may be computed as 1+s_id+L_s×t_id+L_s×80×f_id+L_s×80×8× ul_carrier_id. The s_id may be defined as the logical index of an OFDM symbol, the L_s may be defined as the number of the logical indexes, and the RA-RNTI calculation slot based on 120 kHz SCS is assumed. Alternatively, the RA-RNTI may be computed as 1+s_id+L_s×t_id+L_s×40×f_id+L_s×40×8×ul_carrier_id. The RO allocation slot based on 60 kHz SCS is assumed.

Figure 13:
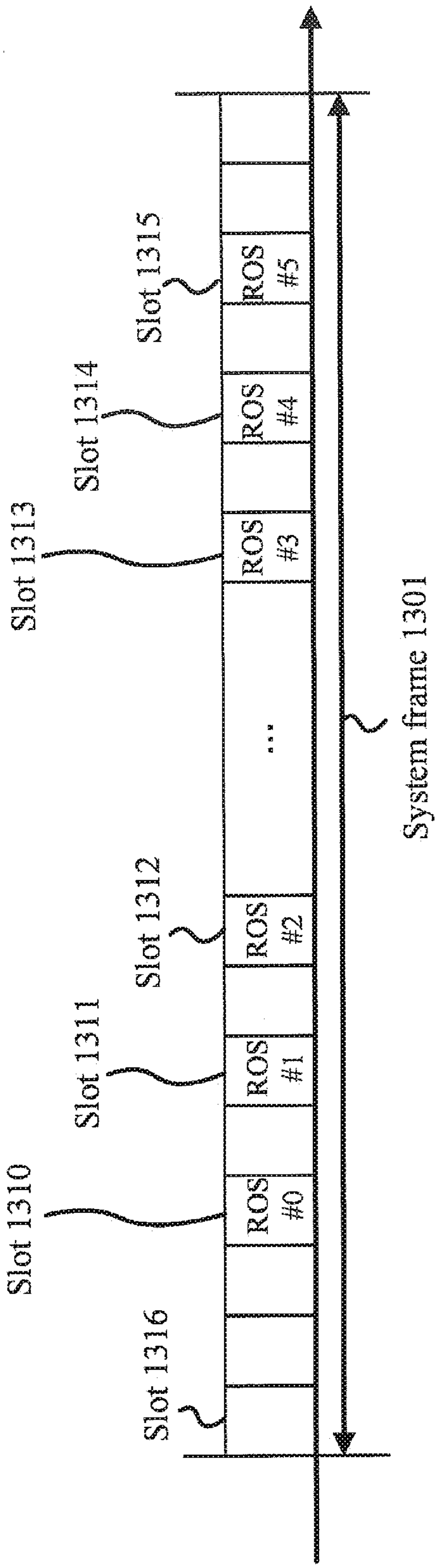
FIG. 13 is a diagram illustrating an example of the logical index of a slot according to an aspect of the present embodiment.

FIG. 13 is a diagram illustrating an example of the logical index of a slot according to an aspect of the present embodiment. System frame 1201 may consist of $N_{L1}$ slots. The slots may be PRACH slots, RO allocation slots, or RA-RNTI calculation slots. By applying a PRACH configuration index to a table of random access configurations, time-domain allocation of PRACH occasions may be determined. A PRACH occasion set (ROS) may include one PRACH occasion or multiple PRACH occasions. In FIG. 13, ROS #0 are allocated in slot 1310, ROS #1 are allocated in slot 1311, ROS #2 are allocated in slot 1312, ROS #3 are allocated in slot 1313, ROS #4 are allocated in slot 1314, and ROS #5 are allocated in slot 1315. No ROS is allocated in slot 1316. A slot allocated with an ROS may be associated with a logical index and the logical index may be determined (given) by the index of ROS. For example, the logical index of slot 1310 is 0. For example, the logical index of slot 1315 is 5. Within a system frame, the number of logical indexes of slots may be determined (given) by the number of ROSes. For example, the number of logical indexes of slots is 6 in system frame 1301. The logical indexes of slots may be used for the calculation of RA-RNTI. The RA-RNTI may be computed as 1+s_id+L_s×t_id+L_s×L_t×f_id+L_s×L_t×8×ul_carrier_id. The t_id may be defined as a logical index of a slot where a ROS is allocated. The L_t may be defined as the number logical indexes of slots. The s_id may be defined as an index of an OFDM symbol within a slot. The L_s may be defined as the number of OFDM symbols in a slot. The length of the OFDM symbol may be determined based on the SCS for PRACH transmission. The s_id may be defined as a logical index of an OFDM symbol within a slot. The L_s may be defined as the number of logical indexes of OFDM symbols in a slot.

The RA-RNTI may be given by (provided by, calculated as, computed as) 1+s_id+14×t_id+14×S_t×f_id+14×S_t×8×ul_carrier_id. The s_id may be an index of the first OFDM symbol of the PRACH. The t_id may be an index of the first slot of the PRACH in a system frame. The f_id may be an index of the PRACH in the frequency domain. The ul_carrier_id may be a uplink carrier used for the PRACH. The S_t may be 80 or 160. Within a system frame, PRACH occasions may be allocated within S_t consecutive PRACH slots. By constraining allocation of the PRACH occasions in time domain, for higher SCS of PRACH, the time-frequency domain location of the PRACH can also be uniquely specified within a system frame. Because there might be no need to perform contention resolution, efficiency of random access procedure can be improved.

The RA-RNTI may be given by (provided by, calculated as, computed as) 1+s_id+14×mod (t_id, S_t)+14×S_t×f_id+14×S_t×8×ul_carrier_id. The s_id may be an index of the first OFDM symbol of the PRACH. The t_id may be an index of the first slot of the PRACH in a system frame. The f_id may be an index of the PRACH in the frequency domain. The ul_carrier_id may be a uplink carrier used for the PRACH. The S_t may be a predetermined value, or given by a higher-layer parameter, or determined at least based on the SCS for PRACH transmission. By constraining allocation of the PRACH occasions in time domain, for higher SCS of PRACH, the time-frequency domain location of the PRACH can also be uniquely specified within a system frame. Because there might be no need to perform contention resolution, efficiency of random access procedure can be improved.

FR1 may be defined as the frequency range designation corresponding to frequency range from 410 MHz to 7125 MHz. FR2 may be defined as the frequency range designation corresponding to frequency range from 24250 MHz to 52600 MHz. FR2 may be defined as the frequency range designation corresponding to frequency range from 24250 MHz to 71000 MHz. FR2 may cover (include, consist of) FR2-1 (FR2.1) and FR2-2 (FR2.2). FR2-1 (FR2.1) may be defined as the frequency range designation corresponding to frequency range from 24250 MHz to 52600 MHz. FR2-2 (FR2.2) may be defined as the frequency range designation corresponding to frequency range from 52600 MHz to 71000 MHz. Hereinafter, FR2-1 and FR2.1 may be interchangeably used, having the same meaning and definition. FR2-2 and FR2.2 may be interchangeably used, having the same meaning and definition.

A quantity $k_{SSB}$ may be the subcarrier offset from subcarrier 0 in common resource block (CRB) $N^{SSB}_{CRB}$ to subcarrier 0 of the SS/PBCH block. $N^{SSB}_{CRB}$ may be obtained from the higher-layer parameter offsetToPointA. The base station device 3 may configure/indicate the subcarrier offset subcarrier 0 in CRB $N^{SSB}_{CRB}$ to subcarrier 0 of the SS/PBCH block by $k_{SSB}$. The terminal device 1 may determine CRB $N^{SSB}_{CRB}$ at least based on subcarrier 0 of the SS/PBCH block and $k_{SSB}$. $k_{SSB}$ may be derived from the frequency difference between the SS/PBCH block and Point A. Point A may serve as a common reference point for resource block grids/resource grids. Point A may be obtained from offsetToPointA for Point A may be obtained from absoluteFrequencyPointA for all other cases. offsetToPointA may represent the frequency offset between point A and the lowest subcarrier of the lowest resource block, which has the subcarrier spacing provided by the higher-layer parameter subCarrierSpacingCommon and overlaps with the SS/PBCH block used by the UE (terminal device 1) for initial cell selection, expressed in units of resource blocks assuming 15 kHz subcarrier spacing for FR1 and 60 kHz subcarrier spacing for FR2.

offsetToPointA may be expressed in units of resource blocks assuming 60 kHz subcarrier spacing for FR2-1. offsetToPointA may be expressed in units of resource blocks assuming 120 kHz subcarrier spacing for FR2-2. offsetToPointA may be expressed in units of resource blocks assuming 60 kHz or 240 kHz or 480 kHz subcarrier spacing for FR2-2. The assumption on the subcarrier spacing for FR2-2 and FR2-1 may be the same or different. The assumption on the subcarrier spacing for FR2-2 and FR2-1 may be separately specified. The terminal device 1 may determine point A at least based on offsetToPointA, assuming that offsetToPointA is expressed in units of resource blocks of 60 kHz subcarrier spacing for FR2-1. The terminal device 1 may determine point A at least based on offsetToPointA, assuming offsetToPointA is expressed in units of resource blocks of 120 kHz or 60 kHz or 240 kHz or 480 kHz subcarrier spacing for FR2-2. The base station device 3 may configure/express offsetToPointA in units of resource blocks of 60 kHz subcarrier spacing for FR2-1. The base station device 3 may configure/express offsetToPointA in units of resource blocks of 120 kHz or 60 kHz or 240 kHz or 480 kHz subcarrier spacing for FR2-2. By specifying the assumed subcarrier spacing for FR2-1 and FR2-2 respectively, the position of point A in frequency domain can be correctly and clearly recognized/determined/used by the terminal device 1 and the base station device 3. That is, with respect to the position of point A in frequency domain, misalignment of determination at the terminal device 1 and configuration at the base station device 3 can be avoided. For example, if the assumed subcarrier spacing is not specified, there is possibility that the terminal device 1 and the base station device 3 determine different point A positions. Since point A can be used for determining the staring subcarrier of a resource grid defined for a numerology and a carrier (the lowest usable subcarrier on the carrier), it is necessary to have aligned understanding on point A position between the terminal device 1 and the base station device 3. Since subcarrier spacings used for FR2-2 in uplink/downlink/sidelink channels may be different from those used for FR2-1, separate assumptions on subcarrier spacing of offsetToPointA for FR2-2 and FR2-1 can enable proper configurations of resource grids. Efficiency of resource grids utilization can be improved. By specifying the assumed subcarrier spacing (for example, 120 kHz) for FR2-2, flexibility of configuring the position of point A can be improved, compared to the case of assuming 60 kHz subcarrier spacing. For example, the maximum frequency offset configured by offsetToPointA can cover (include, be larger than) the maximum channel bandwidth supported in FR2-2. For all SCSs supported in FR2-2 (that is, 120 kHz, 480 kHz, and 960 kHz), the common resource block with index 0 (CRB #0, the lowest CRB) can contain point A by the abovementioned specification. That is, multiple carriers can be aligned by point A. Intra-band continuous CA with no guard band (for example, the guard band between two component carriers is 0) is enabled by the abovementioned specification.

Figure 14:
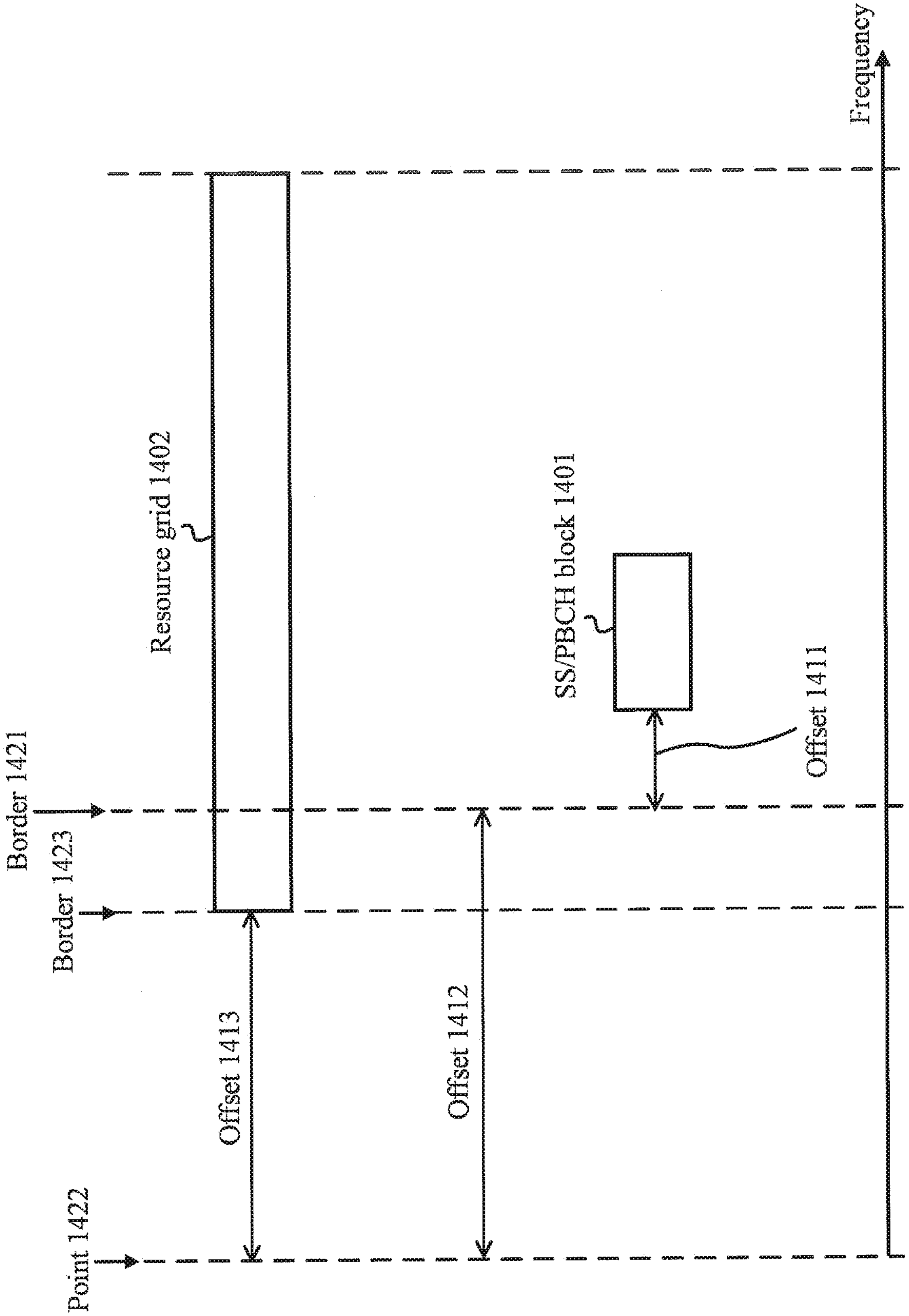
FIG. 14 is a diagram illustrating an example of point A according to an aspect of the present embodiment.

FIG. 14 is a diagram illustrating an example of point A according to an aspect of the present embodiment. The terminal device 1 detects/receives SS/PBCH block 1401. The terminal device 1 may determine border 1421 at least based on the SS/PBCH block 1401 and offset 1411. The border 1421 may be a subcarrier 0 (the lowest indexed subcarrier) in $N^{SSB}_{CRB}$ CRB. The offset 1411 may be provided by a quantity $k_{SSB}$. The offset 1411 may the subcarrier offset from border 1421 to a subcarrier 0 (the lowest indexed subcarrier) of the SS/PBCH block 1401. The base station device 3 may configure/indicate offset 1411 to the terminal device 1. The terminal device 1 may determine point 1422 at least based on the border 1421 and offset 1412. The point 1422 may be point A. The offset 1412 may be provided by offsetToPointA. The offset may present/be the frequency offset between the point 1422 and the border 1421 in units of resource blocks assuming a subcarrier spacing. The assumed subcarrier spacing may be 60 kHz for FR2-1. The assumed subcarrier spacing may be 120 kHz for FR2-2. The base station device 3 may configure/indicate the offset 1412 to the terminal device 1. The terminal device 1 may determine border 1423 at least based on the point 1422 and offset 1413. The border 1423 may be a subcarrier 0 (the lowest indexed subcarrier) of resource grid 1402. The offset 1413 may be provided by a high-layer parameter offsetToCarrier. The offset 1413 may present/be the frequency offset in units of subcarriers. The base station device 3 may configure/indicate the offset 1413 to the terminal device 1.

A slot format may include downlink symbols, uplink symbols, and flexible symbols. The following may be applicable for each serving cell. If a UE (the terminal device 1) is provided tdd-UL-DL-ConfigurationCommon, the UE may set the slot format per slot over a number of slots as indicated by tdd-UL-DL-ConfigurationCommon. The tdd-UL-DL-ConfigurationCommon may provide a reference SCS configuration $u_{ref}$ by referenceSubcarrierSpacing and a pattern1. The pattern1 may provide at least a slot configuration period of P msec by dl-UL-TransmissionPeriodicity. The terminal device 1 may expect the following constraints on configuration of P with respect to a certain numerology. A value P=0.078125 msec may be valid only for $u_{ref}$=6. A value P=0.15625 msec may be valid only for $u_{ref}$=5 or $u_{ref}$=6. A value P=0.3125 msec may be valid only for $u_{ref}$=4 or $u_{ref}$=5 or $u_{ref}$=6. A value 0.625 msec may be valid only for $u_{ref}$=3 or $u_{ref}$=5 or $u_{ref}$=6. A value 1.25 msec may be valid only for $u_{ref}$=2 or $u_{ref}$=3 or $u_{ref}$=5 or $u_{ref}$=6. A value 2.5 msec may be valid only for $u_{ref}$=1 or $u_{ref}$=2 or $u_{ref}$=3 or $u_{ref}$=5 or $u_{ref}$=6. A value 0.625 msec may be valid only for $u_{ref}$=3 or $u_{ref}$=4 or $u_{ref}$=5 or $u_{ref}$=6. A value 1.25 msec may be valid only for $u_{ref}$=2 or $u_{ref}$=3 or $u_{ref}$=4 or $u_{ref}$=5 or $u_{ref}$=6. A value 2.5 msec may be valid only for $u_{ref}$=1 or $u_{ref}$=2 or $u_{ref}$=3 or $u_{ref}$=4 or $u_{ref}$=5 or $u_{ref}$=6. The base station device 3 may follow the aforementioned constraints when configuring P. By specifying the aforementioned constraints, useless configuration of slot format can be avoid. For example, if a value P=0.078125 msec is configured for $u_{ref}$=5, because the periodicity P=0.078125 is shorter than a slot of $u_{ref}$=5, such configuration is useless and should be avoided. Therefore, by specifying the aforementioned constraints, RRC signaling overhead can be reduced and efficiency of RRC configuration can be improved.

A PRACH configuration index may be configured/provided/given by a higher-layer parameter (prach-ConfigurationIndex or msgA-PRACH-ConfigurationIndex). The PRACH configuration index may correspond to (indicate, point to) a row in a table that is used for random access configurations. Based on the PRACH configuration index and the table, the terminal device 1 may determine a preamble format, a PRACH configuration period, a slot number expressed in 60 kHz SCS, a staring symbol index ($l_0$), a number of PRACH slots within a 60 kHz slot, a number of time-domain PRACH occasions within a PRACH slot ($N_t^{RA,slot}$), and a PRACH duration ($N_{dur}^{RA}$).

A PRACH slot may be defined as a slot that is configured for PRACH transmissions (PRACH occasions) and is expressed in PRACH subcarrier spacing. PRACH slot may be defined as a slot that is configured for PRACH transmissions when gaps are not configured for PRACH occasions. The term PRACH slot may be reused when the gaps are configured for PRACH occasions.

The terminal device 1 may receive (be configured by, be indicated with) the higher-layer parameter (prach-ConfigurationIndex or msgA-PRACH-ConfigurationIndex). The terminal device 1 may transmit or attempt to transmit a PRACH at least based on configurations provided/indicated by the higher-layer parameter. The configurations provided/indicated by the higher-layer parameter may at least include a set of PRACH occasions (the number of time-domain PRACH occasions) and a PRACH slot for transmission of the PRACH. In a case that a PRACH occasion in the set of PRACH occasions is allocated to a slot different from the PRACH slot, the PRACH occasion may be dropped for transmission of the PRACH. That is, in a case that the set of PRACH occasions spans multiple slots when allocating symbols (for example, a subset of the set of PRACH occasions are allocated with symbols not in the PRACH slot), a subset of the set of PRACH occasions may be dropped for transmission of the PRACH.

Figure 15:
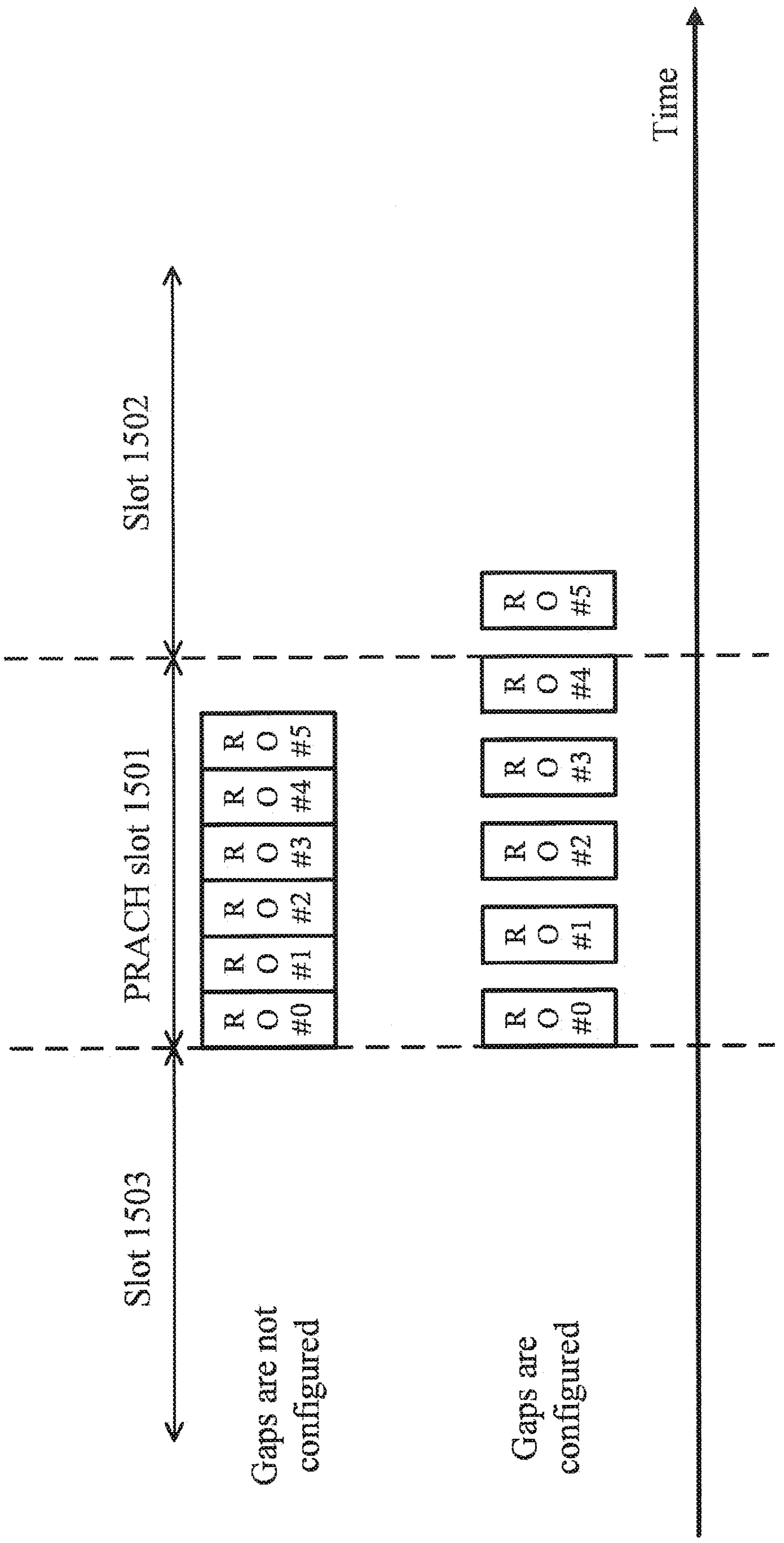
FIG. 15 is a diagram illustrating an example of a PRACH occasion configuration according to an aspect of the present embodiment.

FIG. 15 is a diagram illustrating an example of a PRACH occasion configuration according to an aspect of the present embodiment. Whether gaps between consecutive PRACH occasions and a duration of a gap may be configured or predetermined. For example, in FIG. 15, based on the PRACH configuration index and the table, PRACH slot 1501 is configured for PRACH occasions, the staring symbol index is 0, six time-domain PRACH occasions are configured ($N_t^{RA,slot}=6$), and a PRACH duration is two $N_{dur}^{RA}=2$). When the gaps are not configured or predetermined, symbols #0 and #1 are allocated to RO #0 (PRACH occasion index 0), symbols #8 and #9 are allocated to RO #4, and symbols #10 and #11 are allocated to RO #5. The PRACH occasion index is also denoted as $n_t^{RA}$. The six PRACH occasions are confined within PRACH slot 1501. When the gaps of 1-symol duration are configured or predetermined, symbols #0 and #1 are allocated to RO #0, and symbols #12 and #13 are allocated to RO #4. Symbols #1 and #2 in slot 1502 are allocated to RO #5. The six PRACH occasions span multiple PRACH slots (or the PRACH slot and another slot). That is, the six PRACH occasions are not confined within PRACH slot 1501. RO #0~RO #4 may be included in (associated to) PRACH slot 1501. RO #5 may be considered as being included in (associated to) PRACH slot 1501. RO #5 may be considered as being not included in (associated to) PRACH slot 1501. Slot 1502 may be configured/predetermined for PRACH transmission or other transmissions. Slot 1502 may be in a frame different from the frame that includes PRACH slot 1501. Slot 1502 may be in a frame same as the frame that includes PRACH slot 1501. Slot 1502 may be in a PRACH configuration period different from the PRACH configuration period that includes PRACH slot 1501. Slot 1502 may be in a PRACH association period different from the PRACH association period that includes PRACH slot 1501. Slot 1502 may be in a PRACH association pattern period different from the PRACH association pattern period that includes PRACH slot 1501. RO #5 may be determined as valid or invalid. RO #5 may be dropped/discarded when generating a PRACH occasion list. That is, RO #5 may be removed from the PRACH occasion list. That is, the PRACH occasion list may at least include RO #0~RO #4 and may not include RO #5. The PRACH occasion list may be used for mapping SS/PBCH block indexes to PRACH occasions. The PRACH occasion list may be used for mapping CSI-RS indexes to PRACH occasions. The PRACH occasion list may be used for a purpose other than the aforementioned two purposes. The terminal device 1 may determine that RO #5 is not included in the PRACH occasion list. The base station device 3 may not expect to receive/detect PRACH transmission on RO #5. By not including RO #5 in the PRACH occasion list, procedures such as mapping SS/PBCH block indexes to PRACH occasions and mapping CSI-RS indexes to PRACH occasions can be more efficient.

The terminal device 1 may receive (be configured by) the higher-layer parameter (prach-ConfigurationIndex or msgA-PRACH-ConfigurationIndex). The terminal device 1 may transmit or attempt to transmit a PRACH at least based on configurations provided by the higher-layer parameter. The configurations provided by the higher-layer parameter may at least include a set of PRACH occasions (number of PRACH occasions), a starting symbol $l_0$, a PRACH duration $N_{dur}^{RA}$, and two consecutive PRACH slots for transmission of the PRACH. The terminal device 1 may determine a starting symbol position of a PRACH occasion in the set of PRACH occasions according to $1=l_0+n_t^{RA}(N_{dur}^{RA}+N_g^{RA})+14n_{slot}^{RA}$. That is, the starting symbol position of a PRACH occasion in the set of PRACH occasions is provided by $1=l_0+n_t^{RA}(N_{dur}^{RA}+N_g^{RA})+14n_{slot}^{RA}$. $N_g^{RA}$ may be a duration of a gap between two consecutive PRACH occasions in the set of PRACH occasions. $N_g^{RA}$ may be configured by a higher-layer parameter or predetermined. $n_t^{RA}$ may be the PRACH occasion within the set of PRACH occasions and $n_t^{RA}$ is numbered in increasing order from 0 to $N_t^{RA,slot}-1$. $n_{slot}^{RA}$ may be set to 6 and 14 for PRACH subcarrier spacings 480 kHz and 960 kHz, respectively.

Figure 16:
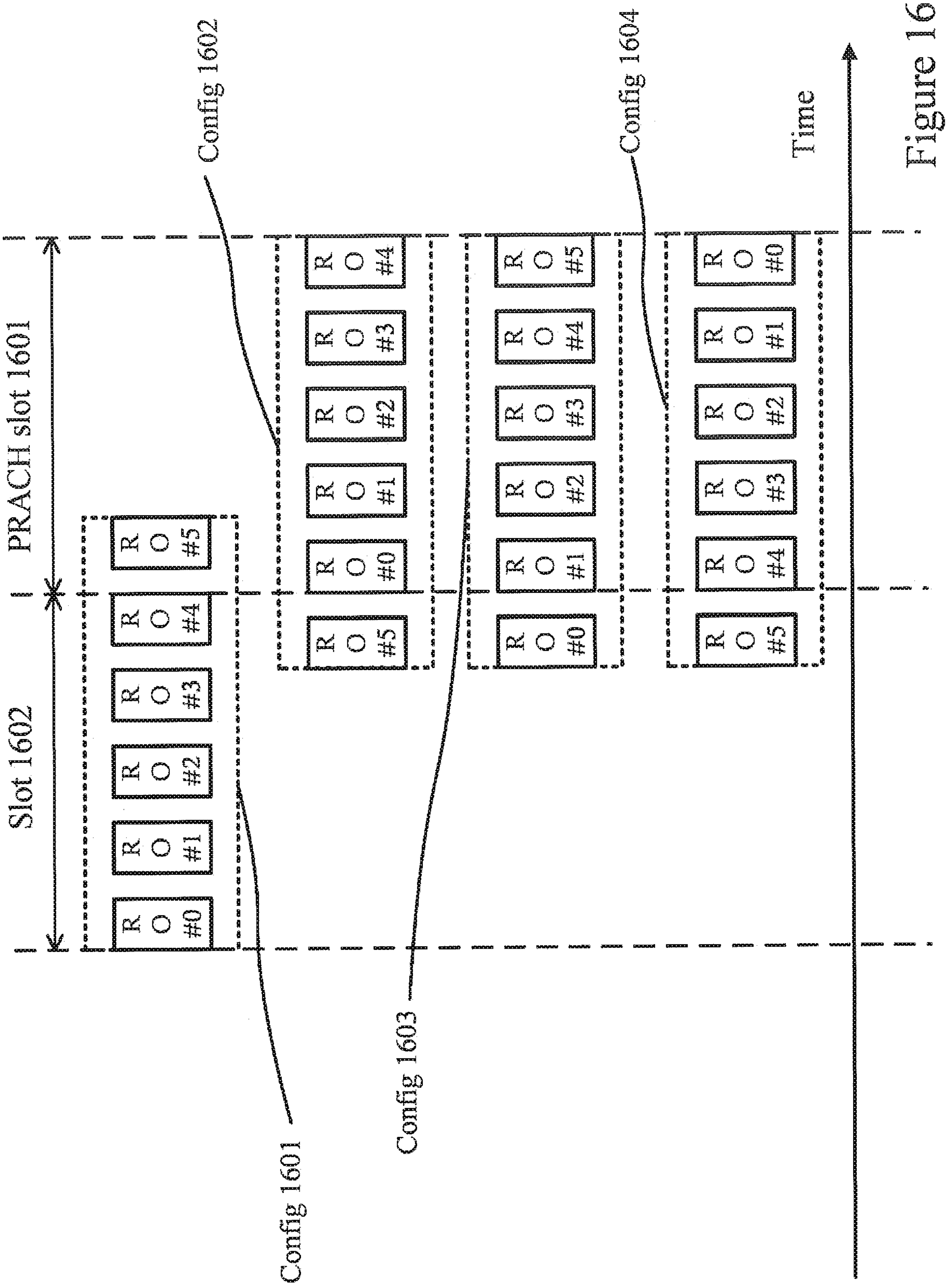
FIG. 16 is a diagram illustrating an example of a PRACH occasion configuration according to an aspect of the present embodiment.

FIG. 16 is a diagram illustrating an example of a PRACH occasion configuration according to an aspect of the present embodiment. Gaps of 1-symbol duration between consecutive PRACH occasions are configured or predetermined. Based on the PRACH configuration index and the table, PRACH slot 1601 is configured for PRACH occasions, six time-domain PRACH occasions are configured ($N_t^{RA,slot}=6$), a PRACH duration is two ($N_{dur}^{RA}=2$), a number of PRACH slots within a reference SCS (for example, 60 kHz) slot, and a starting symbol $l_0$. Slot 1602 may be configured for a PRACH occasion included in the six time-domain PRACH occasions. The terminal device 1 may determine a starting symbol position/index 1 of a PRACH occasion according to $l=l_0+n_t^{RA}(N_{dur}^{RA}+N_g^{RA})+14n_{slot}^{RA}$. Here, $N_g^{RA}=1$ may be the gap duration, $n_t^{RA}$ may be the PRACH occasion within the PRACH slot, numbered in increasing order from 0 to $N_t^{RA,slot}-1$. $n_t^{RA}$ may be the PRACH occasion within the set of PRACH occasions, numbered in increasing RA may be order from 0 to $N_t^{RA,slot}-1$. If PRACH SCS (Delta $f_{RA}$) equals to 480 kHz, $n_{slot}^{RA}$ may be set to 7. If PRACH SCS (Delta $f_{RA}$) equals to 960 kHz, $n_{slot}^{RA}$ may be set to 15. With config 1601, $l_0$ may be set to 0, $n_{slot}^{RA}$ may be set to 6 and 14 for PRACH SCS of 480 kHz and 960 kHz, respectively. RO #0~RO #4 may be allocated in slot 1602. RO #5 may be allocated in PRACH slot 1601. RO #0~RO #4 may be included in (associated to) PRACH slot 1602. RO #5 may be considered as being included in (associated to) PRACH slot 1601. RO #5 may be considered as being included in (associated to) PRACH slot 1602. With config 1602, $l_0$ may be set to 0, $n_{slot}^{RA}$ may be set to 7 and 15 for PRACH SCS of 480 kHz and 960 kHz, respectively. RO #5 may be allocated to symbols #11 and #12 in slot 1602. RO #0~RO #4 may be included in (associated to) PRACH slot 1601. RO #5 may be considered as being included in (associated to) PRACH slot 1601. RO #5 may be considered as being included in (associated to) PRACH slot 1602. With config 1603, the starting symbol position 1 of a PRACH occasion may be given by $l=l_0-N_{RO}(N_{dur}^{RA}+N_g^{RA})+n_t^{RA}(N_{dur}^{RA}+N_g^{RA})+14n_{slot}^{RA}$, where $N_{RO}$ may be set to 0, 1, 2, or 3 by configuration or predetermination. RO #1~ RO #5 may be included in (associated to) PRACH slot 1601. RO #0 may be considered as being included in (associated to) PRACH slot 1601. RO #1 may be considered as being included in (associated to) PRACH slot 1602. With config 1604, the starting symbol position 1 of a PRACH occasion may be given by $l=l_0-N_{RO}(N_{dur}^{RA}+N_g^{RA})+n_t^{RA}(N_{dur}^{RA}+N_g^{RA})+14n_{slot}^{RA}$, where $n_t^{RA}$ may be the PRACH occasion within the set of PRACH occasions, numbered in decreasing order from $N_t^{RA,slot}-1$ to 0 and $N_{RO}$ may be set to 0, 1, 2, or 3 by configuration or predetermination. RO #0~RO #4 may be included in (associated to) PRACH slot 1602. RO #5 may be considered as being included in (associated to) PRACH slot 1601. RO #5 may be considered as being included in (associated to) PRACH slot 1602. The base station device 3 may configure an additional PRACH slot (for example, slot 1602) before PRACH slot 1601 in time domain to accommodate the six PRACH occasions, when the gaps between consecutive PRACH occasions are configured or predetermined. By configuring an additional PRACH slot for PRACH occasions with gaps in between and/or allocating some of the ROs in the additional PRACH slot that is consecutively before the PRACH slot, all the PRACH occasions are allocated within PRACH slots. PRACH transmission opportunities in time domain can be guaranteed such as that a set of PRACH occasions would not be determined as invalid or would not be dropped even if the PRACH occasions are not confined within one PRACH slot.

For a half frame with SS/PBCH blocks, the first symbol indexes for candidate SS/PBCH blocks are determined as in Case A to Case F. The index 0 corresponds to the first symbol of the first slot in a half frame.

Case A is used for SS/PBCH blocks of 15 kHz SCS. In Case A, the first symbols of the candidate SS/PBCH blocks have indexes of {2, 8}+14n.

Case B is used for SS/PBCH blocks of 30 kHz SCS. In Case B, the first symbols of the candidate SS/PBCH blocks have indexes of {4, 8, 16, 20}+28n.

Case C is used for SS/PBCH blocks of 30 kHz SCS. In Case C, the first symbols of the candidate SS/PBCH blocks have indexes of {2, 8}+14n.

Case D is used for SS/PBCH blocks of 120 kHz SCS. In Case D, the first symbols of the candidate SS/PBCH blocks have indexes of {4, 8, 16, 20}+28n.

Case E is used for SS/PBCH blocks of 240 kHz SCS. In Case E, the first symbols of the candidate SS/PBCH blocks have indexes of {8, 12, 16, 20, 32, 36, 40, 44}+56n.

Case F is used for SS/PBCH blocks of 480 kHz SCS. In Case F, the first symbols of the candidate SS/PBCH blocks have indexes of {2, 9}+14n.

Case G is used for SS/PBCH blocks of 960 kHz SCS. In Case G, the first symbols of the candidate SS/PBCH blocks have indexes of {2, 9}+14n.

A value of n may be an integer. The value range of n may be determined/provided/given by whether operation without shared spectrum channel access (licensed operation) or operation with shared spectrum channel access (unlicensed operation). The value range of n may be determined/provided/given by the carrier frequencies are within FR1 or FR2 or FR2-1 or FR2-2.

The candidate SS/PBCH blocks in a half frame are indexed in an ascending order in time from 0 to $L^{bar}_{max}-1$. $L^{bar}_{max}$ is determined according to SS/PBCH block patterns for Cases A through G and corresponding n values. $L_{max}$ is a maximum number of SS/PBCH block indexes in a cell. The maximum number of transmitted SS/PBCH blocks within a half frame is $L_{max}$. For operation without shared spectrum channel access, $L_{max}=L^{bar}_{max}$. For example, $L_{max}=64$ and $L^{bar}_{max}=64$ for 120 kHz or 240 kHz or 480 kHz or 960 kHz SCS of SS/PBCH blocks. For operation with shared spectrum channel access, $L_{max}=8$ for $L^{bar}_{max}=10$ and 15 kHz SCS of SS/PBCH blocks and for $L^{bar}_{max}=20$ and 30 kHz SCS of SS/PBCH blocks. For operation with shared spectrum channel access, $L_{max}=64$ for $L^{bar}_{max}=64$ and 120 kHz or 240 kHz SCS of SS/PBCH blocks. For operation with shared spectrum channel access, $L_{max}=64$ for $L^{bar}_{max}=80$ and 120 kHz or 240 kHz SCS of SS/PBCH blocks. For 480 kHz or 960 kHz SCS of SS/PBCH blocks, $L_{max}=64$. $L^{bar}_{max}$ may be 64, 128, or other values larger than 64 and smaller than 128. $L^{bar}_{max}$ larger than 64 may be only applicable to operation with shared spectrum channel access.

For $L^{bar}_{max}=4$, the terminal device 1 determines the 2 LSB (least significant bit) bits of a candidate SS/PBCH block index per half frame from a one-to-one mapping with an index of the DM-RS sequence transmitted in the PBCH.

For $L^{bar}_{max}>4$, the terminal device 1 determines the 3 LSB (least significant bit) bits of a candidate SS/PBCH block index per half frame from a one-to-one mapping with an index of the DM-RS sequence transmitted in the PBCH. The 3 LSB bits are the $1^{st}$, $2^{nd}$, and $3^{rd}$ bits within the bits used for indication of a candidate SS/PBCH block index. For $L^{bar}_{max}=64$, the terminal device 1 determines 3 MSB (most significant bit) bits of the candidate SS/PBCH block index from PBCH payload $a^{bar}_{A+5}$, $a^{bar}_{A+6}$, $a^{bar}_{A+7}$. For $L^{bar}_{max}=80$, 128, or other values larger than 64 and smaller than 128, 7 bits may be used for indication of the candidate SS/PBCH block index. The terminal device 1 may determine 4 MSB bits of the candidate SS/PBCH block index from PBCH payload $a^{bar}_{A+5}$, $a^{bar}_{A+6}$, $a^{bar}_{A+7}$ and a first MIB payload bit. That is, the PBCH payload $a^{bar}_{A+5}$, $a^{bar}_{A+6}$, $a^{bar}_{A+7}$ may be the $6^{th}$, $5^{th}$, and $4^{th}$ bits of the candidate SS/PBCH block index, respectively. The first MIB payload bit may be the $7^{th}$ bit (the MSB bit) of the candidate SS/PBCH block index. The first MIB payload bit may be used for indication of the candidate SS/PBCH block index. The first MIB payload bit may be a MIB payload bit used for indication of subCarrierSpacingCommon. The first MIB payload bit may be the LSB of MIB payload bits used for indication of ssb-SubcarrierOffset. The first MIB payload bit may be the spare bit in MIB payload.

The PBCH payload bits in a transport block delivered to layer 1 are denoted by $a^{bar}_{0}$, $a^{bar}_{1}$, . . . , $a^{bar}_{A-1}$. Here, A is the payload size generated by higher layers. Notations A and $A^{bar}$ are both used to denote the payload size generated by higher layers and may be used interchangeably. For $L^{bar}_{max}=64$, 80, 128, or other values larger than 64 and smaller than 128, $a^{bar}_{A+5}$, $a^{bar}_{A+6}$, $a^{bar}_{A+7}$ may be the $6^{th}$, $5^{th}$, and $4^{th}$ bits of the candidate SS/PBCH block index, respectively.

A higher layer parameter (information element) MIB includes at least a higher layer parameter (field) subCarrierSpacingCommon and a higher layer parameter (field) ssb-SubcarrierOffset. The higher layer parameter subCarrierSpacingCommon may be described by ENUMERATED type with two entries. 1 bit of MIB payload (1 MIB payload bit) may be used for indication of subCarrierSpacingCommon. The higher layer parameter ssb-SubcarrierOffset may be described by INTEGER type with a range of (0, 1, . . . , 15). 4 bits of MIB payload (4 MIB payload bits) may be used for indication of ssb-SubCarrierOffset. The higher layer parameter ssb-SubcarrierOffset may correspond to $k_{SSB}$. $k_{SSB}$ is the frequency domain offset between a SS/PBCH block and the overall resource block grid in number of subcarriers.

The terminal device 1 may assume that transmission of SS/PBCH blocks in a half frame is within a discovery burst transmission window (DBTW) that starts from the first symbol of the first slot in a half-frame. The terminal device 1 may be provided per serving cell by DiscoveryBurst-WindowLength/discoveryBurstWindowLength-r16 a duration of the discovery burst transmission window. DiscoveryBurst-WindowLength/discoveryBurstWindowLength-r16 may be provided by/included in ServingCellConfigCommon or a higher layer parameter SIB1. DiscoveryBurst-WindowLength/discoveryBurstWindowLength-r16 may not be explicitly indicated by MIB. If DiscoveryBurst-Window-Length/discoveryBurstWindowLength-r16 is not provided, the terminal device 1 may assume that the duration of the discovery burst transmission window is a half frame (5 ms). Before decoding SIB1, the terminal device 1 may assume that DBTW is enabled for operation with or without shared spectrum channel access. Before decoding SIB1, the terminal device 1 may assume that DBTW is enabled, without knowing the operation is with or without shared spectrum channel. Whether DBTW is enabled may be indicated by MIB or SIB1. For a serving cell, The terminal device 1 assumes that a periodicity of the discovery burst transmission window is same as a periodicity of half frames for receptions of SS/PBCH blocks in the serving cell.

For operation with shared spectrum channel access, ssb-SubcarrierOffset is used also for deriving the QCL relationship between SS/PBCH blocks in a serving cell. The value range of ssb-SubcarrierOffset may be extended by an additional most significant bit encoded within PBCH. The higher layer parameter ssb-SubcarrierOffset may indicate that this cell does not provide SIB1 and that there is hence no CORESET #0 configured in MIB. In this case, the field pdcch-ConfigSIB1 may indicate the frequency positions where the terminal device 1 may (not) find a SS/PBCH with a control resource set and search space for SIB1, subcarrier spacing for SIB1, Msg 2/Msg 4 for initial access, paging and broadcast SI-messages. If the terminal device 1 acquires this MIB on an FR1 carrier frequency, the value scs15or60 corresponds to 15 kHz and the value scs30or120 corresponds to 30 kHz. If the terminal device 1 acquires this MIB on an FR2 carrier frequency, the value scs15or60 corresponds to 60 kHz and the value scs30or120 corresponds to 120 kHz. For operation with shared spectrum channel access or FR2-2, the subcarrier spacing for SIB1 is same as that for the corresponding SSB and ssb-SubcarrierOffset instead may be used for deriving the QCL relationship between SS/PBCH blocks in a serving cell.

FIG. 17 is a diagram illustrating an example of mapping the combination of MIB payload bits to Q according to an aspect of the present embodiment.

FIG. 18 is a diagram illustrating an example of mapping a MIB payload bit to Q' according to an aspect of the present embodiment.

For operation with shared spectrum channel access, the terminal device 1 may assume that SS/PBCH blocks in a serving cell that are within a same discovery burst transmission window (DBTW) or across discovery burst transmission windows (DBTWs) are quasi co-located with respect to average gain, quasi co-location typeA and typeD properties, when applicable, if a value of ($N^{PBCH}_{DM\text{-}RS}$ mod $N^{QCL}_{SSB}$) is the same among the SS/PBCH blocks. $N^{PBCH}_{DM\text{-}RS}$ is an index of a DM-RS sequence transmitted in a PBCH of a corresponding SS/PBCH block. Here, $N^{QCL}_{SSB}$ is also denoted as Q or Q value. Q may be either provided by ssb-PositionQCL or, if ssb-PositionQCL is not provided, obtained from a MIB provided by a SS/PBCH block according to Table 17-1 in FIG. 17 with $k_{SSB}$<24. For $L^{bar}_{max}$=80, 128, or other values larger than 64 and smaller than 128 (for example, operation with share spectrum channel access in FR2-2), Q may be obtained from a MIB provided by a SS/PBCH block according to Table 17-2 in FIG. 17. q1, q2, q3 and q4 may be different integer values that are larger than 1 and smaller than $L^{bar}_{max}$. For example, q1, q2, q3, and q4 may be 8, 16, 32, 64, respectively. For example, q1, q2, q3 or q4 may be used to indicate that DBTW is enabled or disabled.

The terminal device 1 may determine an SS/PBCH block index according to ($N^{PBCH}_{DM\text{-}RS}$ mod $N^{QCL}_{SSB}$), or according to ($i^{bar}$ mod $N^{QCL}_{SSB}$). $i^{bar}$ is the candidate SS/PBCH block index. The terminal device 1 may assume that within a discovery burst transmission window (DBTW), a number of transmitted SS/PBCH blocks on a serving cell is not larger than Q and a number of transmitted SS/PBCH blocks with a same SS/PBCH block index is not larger than one.

For the SS/PBCH block and CORESET multiplexing pattern 1, the terminal device 1 may monitor/receive/detect PDCCH in the Type0-PDCCH CSS set over slots that include Type0-PDCCH monitoring occasions associated with SS/PBCH blocks that are quasi co-located with the SS/PBCH block that provides a CORESET for Type0-PDCCH CSS set with respect to average gain, quasi co-location typeA and typeD, when applicable. For a candidate SS/PBCH block index $i^{bar}$, where $i^{bar}$ is no less than 0 and no greater than $L^{bar}_{max}-1$, two consecutive slots starting from slot no may include the associated Type0-PDCCH monitoring occasions. The terminal device 1 may determine no at least based on $i^{bar}$. That is, no may be associated to $i^{bar}$. In a case that a PDCCH is detected, the terminal device 1 may receive/detect/decode SIB1 included in the PDSCH that is scheduled by the PDCCH. In a case that no PDCCH is detected, the terminal device 1 may monitor/receive/detect PDCCH in the Type0-PDCCH CSS set over slots that include Type0-PDCCH monitoring occasions associated with a candidate SS/PBCH block index $i^{bar}+N_Q Q^{assumption}$. The terminal device 1 may be indicated with Q by MIB. The terminal device 1 may be indicated with Q' by MIB. The terminal device 1 may be indicated neither Q nor Q' in MIB. In a case that Q is indicated by MIB, $Q^{assumption}$ may be provided by/given by Q. In a case that Q' is indicated by MIB, $Q^{assumption}$ may be provided by/given by Q'. The terminal device 1 may be not indicated with Q or Q' by MIB. That is, no MIB payload bit may be used for indication of Q or Q'. In a case that neither Q nor Q' is indicated by MIB (no MIB payload bit is used for Q or Q' indication), $Q^{assumption}$ or Q or Q' may be determined as/predefined by a default value. The default value may be the minimum value or the maximum value of available Q values. The default value may be a value among the available Q values. For example, the default value may be 1, 2, 4, 8, 16, 32, or 64. For example, the default value may be 8, 16, 32, or 64 for 480 kHz or 960 kHz SCS SS/PBCH blocks. No may be an integer ranging from 0 to floor ($L^{bar}_{max}$/Q). No may be an integer ranging from 0 to floor ($L^{bar}_{max}$/Q'). No may be an integer ranging from 0 to floor ($L_{bar}^{max}/Q^{assumption}$). The base station device 3 may not explicitly indicate Q or Q' by MIB. The base station device 3 may transmit SS/PBCH blocks that are quasi co-located with respect to average gain, quasi co-location typeA and typeD properties, when applicable, if a value of ($N^{PBCH}_{DM\text{-}RS}$ mod Q) is the same among the SS/PBCH blocks. By using no MIB payload bit for Q or Q' indication, one or more MIB payload bits are saved and can be used for other important purposes. Utilization efficiency of MIB payload can be improved.

For 120 kHz SCS SS/PBCH blocks in FR2-1 and FR2-2 (FR2), the terminal device 1 may expect that Q is indicated in MIB and may make the quasi co-location assumption with $Q^{assumption}$=Q (namely, a first assumption method). For 480 kHz or 960 kHz SCS SS/PBCH blocks in FR2-1 and FR2-2 (FR2), the terminal device 1 may expect that Q' is indicated in MIB and may make the quasi co-location assumption with $Q^{assumption}$=Q' (namely, a second assumption method). The terminal device 1 may switch between the first assumption method and the second assumption method, at least based on SCS of the SS/PBCH blocks and the operation band. The base station device 3 may indicate Q (using 2 MIB payload bits) or Q' (using 1 MIB payload bit) at least based on the SCS of SS/PBCH blocks and the operation band. By switching the assumption methods (Q indication or Q' indication), utilization efficiency of MIB payload can be improved or the processing load for PDCCH blind decoding can be maintained/constrained.

The terminal device 1 may be indicated with Q' by MIB. The terminal device 1 may be indicated with Q by SIB1. Q' may be indicated by a second MIB payload bit. Q' may be equal to Q. Q' may be different from Q. Q' may be integer fraction of Q. For example, Q' may be 1, 2, 4, 8, 16, 32, or 64 for Q=64. For example, Q' may be 1, 2, 4, 8, 16, or 32 for Q=32. For example, Q' may be 1, 2, 4, 8, or 16 for Q=16. For example, Q' may be 1, 2, 4, or 8 for Q=8. The second MIB payload bit may be different from the first MIB payload bit. The second MIB payload bit may be a MIB payload bit used for indication of subCarrierSpacingCommon. The second MIB payload bit may be the LSB of MIB payload bits used for indication of ssb-SubcarrierOffset. The second MIB payload bit may be the spare bit in MIB payload. As shown in Table 18-1 in FIG. 18, in a case that the second MIB payload bit is the MIB payload bit used for indication of subCarrierSpacingCommon, subCarrierSpacingCommon configured with scs15or60 may indicate Q'=q1 and subCarrierSpacingCommon configured with scs30or120 may indicate Q'=q2. As shown in Table 18-2 in FIG. 18, in a case that the second MIB payload bit is the LSB of MIB payload bits used for indication of ssb-SubcarrierOffset, the LSB of 0 value may indicate Q'=q1 and the LSB of 1 value may indicate Q'=q2. q1 and q2 may be different values. q1 and q2 may be larger than 1 and no larger than 64. q1 and q2 may be integer fraction of 64. For example, q1=8 and q2-32. For example, q1=32 and q2=8. The base station device 3 may indicate Q' by the second MIB payload bit in MIB. The base station device 3 may indicate Q via SIB1. By using only one MIB payload bit (instead of two bits or more) for Q' indication, one or more MIB payload bits are saved and can be used for other important purposes. Utilization efficiency of MIB payload can be improved.

A third MIB payload bit may indicate whether DBTW is enable or disabled. The third MIB payload bit may be different from both the first MIB payload bit and the second MIB payload bit. The third MIB payload bit may be a MIB payload bit used for indication of subCarrierSpacingCommon. The third MIB payload bit may be the LSB of MIB payload bits used for indication of ssb-SubcarrierOffset. The third MIB payload bit may be the spare bit in MIB payload. The base station device 3 may indicate whether DBTW is enable or disabled by the third MIB payload bit. By indicating whether DBTW is enable or disabled by MIB, the processing load for PDCCH blind decoding can be reduced/maintained.

Each of a program running on the base station device 3 and the terminal device 1 according to an aspect of the present invention may be a program that controls a Central Processing Unit (CPU) and the like, such that the program causes a computer to operate in such a manner as to realize the functions of the above-described embodiment according to the present invention. The information handled in these devices is transitorily stored in a Random-Access-Memory (RAM) while being processed. Thereafter, the information is stored in various types of Read-Only-Memory (ROM) such as a Flash ROM and a Hard-Disk-Drive (HDD), and when necessary, is read by the CPU to be modified or rewritten.

Note that the terminal device 1 and the base station device 3 according to the above-described embodiment may be partially achieved by a computer. In this case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, a CD-ROM, and the like, and a storage device built into the computer system such as a hard disk.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station device 3 according to the above-described embodiment may be achieved as an aggregation (an device group) including multiple devices. Each of the devices configuring such an device group may include some or all of the functions or the functional blocks of the base station device 3 according to the above-described embodiment. The device group may include each general function or each functional block of the base station device 3. Furthermore, the terminal device 1 according to the above-described embodiment can also communicate with the base station device as the aggregation.

Furthermore, the base station device 3 according to the above-described embodiment may serve as an Evolved Universal Terrestrial Radio Access Network (E-UTRAN) and/or NG-RAN (Next Gen RAN, NR-RAN). Furthermore, the base station device 3 according to the above-described embodiment may have some or all of the functions of a node higher than an eNodeB or the gNB.

Furthermore, some or all portions of each of the terminal device 1 and the base station device 3 according to the above-described embodiment may be typically achieved as an LSI which is an integrated circuit or may be achieved as a chip set. The functional blocks of each of the terminal device 1 and the base station device 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, according to the above-described embodiment, the terminal device has been described as an example of a communication device, but the present invention is not limited to such a terminal device, and is applicable to a terminal device or a communication device of a fixed-type or a stationary-type electronic device installed indoors or outdoors, for example, such as an Audio-Video (AV) device, a kitchen device, a cleaning or washing machine, an air-conditioning device, office equipment, a vending machine, and other household devices.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

The invention claimed is:

1. A terminal device comprising:

reception circuitry configured to:

receive synchronization signal/physical broadcast channel (SS/PBCH) blocks, a master information block (MIB), a system information block (SIB), and a physical downlink control channel (PDCCH); and conduct a quasi co-location (QCL) assumption among the SS/PBCH blocks with a $Q^{assumption}$ value; wherein the MIB includes a first MIB payload bit indicating a candidate SS/PBCH block index corresponding to the SS/PBCH block;

in a case that a Q value is indicated by the SIB, the reception circuitry is configured to conduct the QCL assumption with the Q value as being the $Q^{assumption}$ value;

in a case that a Q' value is indicated by the MIB, the reception circuitry is configured to conduct the QCL assumption with the Q' value as being the $Q^{assumption}$ value;

in a case that neither the Q value nor the Q' value is indicated, the reception circuitry is configured to conduct the QCL assumption with a predetermined Q' value as being the $Q^{assumption}$ value; and the Q' value is an integer fraction of the Q value.

2. The terminal device according to claim 1, wherein the MIB includes a second MIB payload bit, wherein the second MIB payload bit indicates whether a discovery burst transmission window (DBTW) is enabled or disabled.

3. A base station device comprising:

transmission circuitry configured to transmit synchronization signal/physical broadcast channel (SS/PBCH) blocks, a master information block (MIB), a system information block (SIB), and a physical downlink control channel (PDCCH); wherein the MIB includes a first MIB payload bit indicating a candidate SS/PBCH block index corresponding to the SS/PBCH block;

in a case that a Q value is indicated by the SIB, the transmission circuitry is configured to conduct a quasi-colocation (QCL) assumption with the Q value as being a-$Q^{assumption}$ value;

in a case that a Q' value is indicated by the MIB, the transmission circuitry is configured to conduct the QCL assumption with the Q' value as being the $Q^{assumption}$ value;

in a case that neither the Q value nor the Q' value is indicated, the transmission circuitry is configured to conduct the QCL assumption with a predetermined Q' value as being the $Q^{assumption}$ value; and the Q' value is an integer fraction of the Q value.

4. The base station device according to claim 3, wherein the MIB includes a second MIB payload bit, wherein the second MIB payload bit indicates whether a discovery burst transmission window (DBTW) is enabled or disabled.

* * * * *